(12) United States Patent
Chang et al.

(10) Patent No.: US 7,174,440 B2
(45) Date of Patent: Feb. 6, 2007

(54) METHOD AND APPARATUS FOR PERFORMING BLOCK CACHING IN A NON-VOLATILE MEMORY SYSTEM

(75) Inventors: Robert C Chang, Danville, CA (US); Bahman Qawami, San Jose, CA (US); Farshid Sabet-Sharghi, San Jose, CA (US); Ping Li, Santa Clara, CA (US)

(73) Assignee: SanDisk Corporation, Milpitas, CA (US)

( * ) Notice: Subject to any disclaimer, the term of this patent is extended or adjusted under 35 U.S.C. 154(b) by 327 days.

(21) Appl. No.: 10/678,672

(22) Filed: Oct. 2, 2003

(65) Prior Publication Data
US 2004/0083348 A1    Apr. 29, 2004

Related U.S. Application Data

(60) Provisional application No. 60/421,910, filed on Oct. 28, 2002.

(51) Int. Cl.
*G06F 12/10* (2006.01)

(52) U.S. Cl. ........................ 711/202; 711/103
(58) Field of Classification Search ............ None
See application file for complete search history.

(56) References Cited

U.S. PATENT DOCUMENTS

| 5,222,109 A | 6/1993 | Pricer ................ 377/24.1 |
| 5,297,148 A | 3/1994 | Harari et al. ........... 371/10.2 |
| 5,388,083 A | 2/1995 | Assar et al. .......... 365/218 |
| 5,438,573 A | 8/1995 | Mangan et al. ........... 371/10.3 |
| 5,568,439 A | 10/1996 | Harari ................ 365/218 |
| 5,598,370 A | 1/1997 | Niijima et al. .......... 365/185.33 |
| 5,835,935 A | 11/1998 | Estakhri et al. ............ 711/103 |
| 5,845,313 A | 12/1998 | Estakhri et al. ............ 711/103 |
| 5,860,082 A | 1/1999 | Smith et al. ............... 711/103 |
| 5,907,856 A | 5/1999 | Estakhri et al. ............ 711/103 |
| 5,924,113 A | 7/1999 | Estakhri et al. ............ 711/103 |
| 5,937,425 A | 8/1999 | Ban |

(Continued)

FOREIGN PATENT DOCUMENTS

JP    62-283496    12/1987

(Continued)

OTHER PUBLICATIONS

Kim, Jesung et al., "A Space-Effiicient Flash Translation Layer for Compactflash Systems", IEEE Transactions on Consumer Electronics, vol. 48, No. 2, May 2002.

*Primary Examiner*—Brian R. Peugh
(74) *Attorney, Agent, or Firm*—Anderson, Levine & Lintel

(57) ABSTRACT

Methods and apparatus for caching updates or new data associated with a logical block are disclosed. According to one aspect of the present invention, a method for processing contents associated with blocks of a non-volatile memory includes obtaining a first set of contents that is associated with a first group of logical pages associated with a first logical block, and writing the first set of contents into a memory area. The first set of contents is then written from the memory area into a first group of physical pages associated with a second physical block that is then mapped to the first logical block. In one embodiment, the memory area is one of a RAM cache and a physical block cache.

18 Claims, 32 Drawing Sheets

U.S. PATENT DOCUMENTS

| | | |
|---|---|---|
| 6,000,006 A | 12/1999 | Bruce et al. |
| 6,016,275 A | 1/2000 | Han ....................... 365/185.29 |
| 6,081,447 A | 6/2000 | Lofgren et al. ........ 365/185.02 |
| 6,115,785 A | 9/2000 | Estakhri et al. ............. 711/103 |
| 6,125,435 A | 9/2000 | Estakhri et al. ............. 711/201 |
| 6,230,233 B1 | 5/2001 | Lofgren et al. ............. 711/103 |
| 6,260,156 B1 | 7/2001 | Garvin et al. ................... 714/8 |
| 6,426,893 B1 | 7/2002 | Conley et al. ......... 365/185.11 |
| 2003/0110343 A1* | 6/2003 | Hagiwara et al. ............... 711/5 |

FOREIGN PATENT DOCUMENTS

JP        62-283497        12/1987

* cited by examiner

METHOD AND APPARATUS FOR PERFORMING BLOCK CACHING IN A NON-VOLATILE MEMORY SYSTEM

The present invention claims priority of U.S. Provisional Patent Application No. 60/421,910, filed Oct. 28, 2002, which is hereby incorporated by reference in its entirety.

CROSS REFERENCE TO RELATED APPLICATIONS

The present invention is related to U.S. patent application Ser. No. 10/281,739, now U.S. Pat. No. 6,985,992, Ser. No. 10/281,8231, now U.S. Pat. No. 7,035,967, Ser. No. 10/281,670, now U.S. Pat. No. 6,973,531, Ser. No. 10/281,824, now U.S. Pat. No. 7,096,313, Ser. No. 10/281,631, now U.S. Pat. No. 7,039,788, Ser. Nos. 10/281,855, 10/281,762, 10/281,696, now U.S. Pat. No. 6,831,865, Ser. No. 10/281,626, now U.S. Pat. No. 7,103,732, and Ser. No. 10/281,804, as well as co-pending U.S. Provisional Patent Application Nos. 60/421,725, 60/421,965, 60/422,166, 60/421,746, and 60/421,911, each filed on Oct. 28, 2002, which are each incorporated herein by reference in their entireties.

BACKGROUND OF THE INVENTION

1. Field of Invention

The present invention relates generally to mass digital data storage systems. More particularly, the present invention relates to systems and methods for allowing updated contents associated with logical pages of a logical block to be cached before being written into a physical block that corresponds to the logical block.

2. Description of the Related Art

The use of non-volatile memory systems such as flash memory storage systems is increasing due to the compact physical size of such memory systems, and the ability for non-volatile memory to be repetitively reprogrammed. The compact physical size of flash memory storage systems facilitates the use of such storage systems in devices which are becoming increasingly prevalent. Devices which use flash memory storage systems include, but are not limited to, digital cameras, digital camcorders, digital music players, handheld personal computers, and global positioning devices. The ability to repetitively reprogram non-volatile memory included in flash memory storage systems enables flash memory storage systems to be used and reused.

In general, flash memory storage systems may include flash memory cards and flash memory chip sets. Flash memory chip sets generally include flash memory components and a controller component. Typically, a flash memory chip set may be arranged to be assembled into an embedded system. The manufacturers of such assemblies or host systems typically acquire flash memory in component-form, as well as other components, then assemble the flash memory and the other components into a host system.

Logical blocks of a flash memory system are typically mapped to physical blocks. For instance, a logical block which includes 32 logical pages may be mapped to a physical block which includes 32 physical pages. When new or updated data associated with the logical block is to be written into the physical block and there is no available space in the physical block to accommodate the data, then a spare physical block is typically obtained. Once the spare physical block is obtained, the new or updated data is merged into the spare physical block with data from the original physical block.

FIG. 1 is a diagrammatic representation of a logical block with updated contents and physical blocks which may be obtained to accommodate the updated contents. At a time t1, a logical block 'A' 202 is updated such that new data is included in a third logical page 204c of logical block 'A' 202. When a physical block 'A' 212 is full to the extent that physical block 'A' 212 updated contents associated with third logical page 204c may not be written into physical block 'A' 212, a new physical block 'B' 222 may be obtained. The contents of substantially all physical pages 214 of physical block 'A' 212, with the exception of the contents of third physical page 214c, may be written into physical block 'B' 222, along with the updated contents associated with third logical page 204c. As a result, physical block 'B' 222 contains the most current data associated with logical block 'A' 202 at time t1. Once physical block 'B' 222 is written to, logical block 202 is mapped to physical block 'B' 222, and physical block 'A' 212 is typically erased. One conventional process of writing updated contents into a physical block will be discussed below with respect to FIG. 2.

At a time t2, logical block 'A' 202', which is mapped to physical block 'B' 222, is updated such that contents associated with a first logical page 204a' are either new or updated. Since physical block 'B' 222 is full or otherwise may not be updated to include contents associated with first logical page 204a', a new physical block 'C' 232 may be obtained. The contents of substantially all physical pages 224 of physical block 'B' 222, aside from the contents of first physical page 224a, may be written into physical block 'C' 232 with the updated contents associated with first logical page 214a such that physical block 'C' 232 contains the most current data associated with logical block 'A' '202' at time t2. Physical block 'B' 222 is generally erased after physical block 'C' 232 is written into and mapped to logical block 'A' 202'.

Referring next to FIG. 2, the steps associated with one method of writing updated contents of a page associated with a logical block into a physical block will be described. A process 250 of allowing an updated page associated with a logical block to be written into a physical block begins at step 254 in which a page, e.g., page 'X,' associated with logical block 'A' is updated. Updating page 'X' of logical block 'A' typically includes changing the contents associated with page 'X.' Once page 'X' of logical block 'A' is updated, a new physical block 'B,' which is to be mapped to or otherwise associated with logical block 'A' is obtained in step 258. New physical block 'B' may be obtained when a physical block which is currently associated with logical block 'A' does not have available space into which the updated contents of page 'X' may be written. As will be appreciated by those skilled in the art, new physical block 'B' may be obtained from a spare block pool.

In step 262, after new physical block 'B' is obtained, the old contents of a physical block 'A' which is currently associated with logical block 'A' are merged into physical block 'B' along with the updated contents of page 'X' of logical block 'A.' In other words, substantially all contents of physical block 'A,' except for the contents which were associated with page 'X' of logical block 'A,' are written into logical block 'B' with the updated contents of page 'X' of logical block 'A.' As such, physical block 'B' contains the most recent contents associated with logical block 'A.'

After contents are written into physical block 'B,' physical block 'A' is erased in step 266, and disassociated from logical block 'A' in step 270. Once physical block 'A' is erased and disassociated from logical block 'A,' physical block 'A' is then typically available to be used as a spare block, and the process of allowing an updated page associated with a logical block to be written into a physical block is completed.

Typically, processes of writing contents into physical blocks and erasing contents of physical blocks are time consuming and may consume significant computational resources. Often, each time a logical page of a logical block is to be updated, one physical block is written into while another physical block is erased. As such, when there are many pages to be updated, there may be a substantially constant erasing of blocks, obtaining of new blocks, and writing of data into the new blocks. Constantly writing to blocks and erasing blocks may result in a relatively significant degradation of the performance of a memory system.

Therefore, what is needed is a method and an apparatus that enables the number of write and erase processes which occur in response to logical page updates to be reduced. Specifically, what is desired is a system which allows the volume of write and erase operations associated with performing updates in a physical block domain which correspond to updates in a logical block domain to be reduced substantially without compromising the ability to perform updates in the physical block domain.

SUMMARY OF THE INVENTION

The present invention relates to a system and a method for caching updates or new data associated with a logical block. According to one aspect of the present invention, a method for processing contents associated with blocks of a non-volatile memory includes obtaining a first set of contents that is associated with a first group of logical pages associated with a first logical block, and writing the first set of contents into a memory area. The first set of contents is then written from the memory area into a first group of physical pages associated with a second physical block that is then mapped to the first logical block. In one embodiment, the memory area is one of a RAM cache and a physical block cache.

In another embodiment, the first physical block includes a second set of contents, and the method includes writing at least some of the second set of contents into the second physical block along with the first set of contents. In such an embodiment, the second set of contents may be erased from the first physical block, and the first physical block may be unmapped or substantially disassociated from the first logical block.

Caching new contents, which may be updated contents, associated with a logical block enables the new contents to be temporarily stored until substantially all new contents associated with the logical block have been processed. When all new contents which are to be processed have been processed, at least some of the new contents may be copied, along with any appropriate contents of an original physical block which is mapped to the logical block, such that the most recent contents associated with the logical block are written into a new physical block. By using a caching process, the number of write operations and read operations associated with processing updates or new additions associated with a logical block may generally be reduced. Hence, the performance of an overall memory system which uses a caching process may be enhanced.

According to another aspect of the present invention, a method for processing updated contents associated with a first logical block within a non-volatile memory system, includes receiving a first update associated with a first logical block, storing the first update into a cache, and determining when to store contents of the cache into a second physical block. The method also includes storing contents of the cache, which include the first update, into the second physical block when it is determined that the contents of the cache are to be stored into the second physical block. The second physical block may then be mapped to the first logical block, and the first physical block may be unmapped from the first logical block after the contents of the cache are stored into the second physical block.

In one embodiment, determining when to store the contents of the cache into the second physical block includes determining when a second logical block is to be processed. When it is determined that the second logical block is to be processed, the contents of the cache are stored into the second physical block. In another embodiment, the contents of the cache include at least some contents associated with the first physical block.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which:

FIG. 3b is a diagrammatic representation a memory device, e.g., memory device 120 of FIG. 3a.

Figure 7:
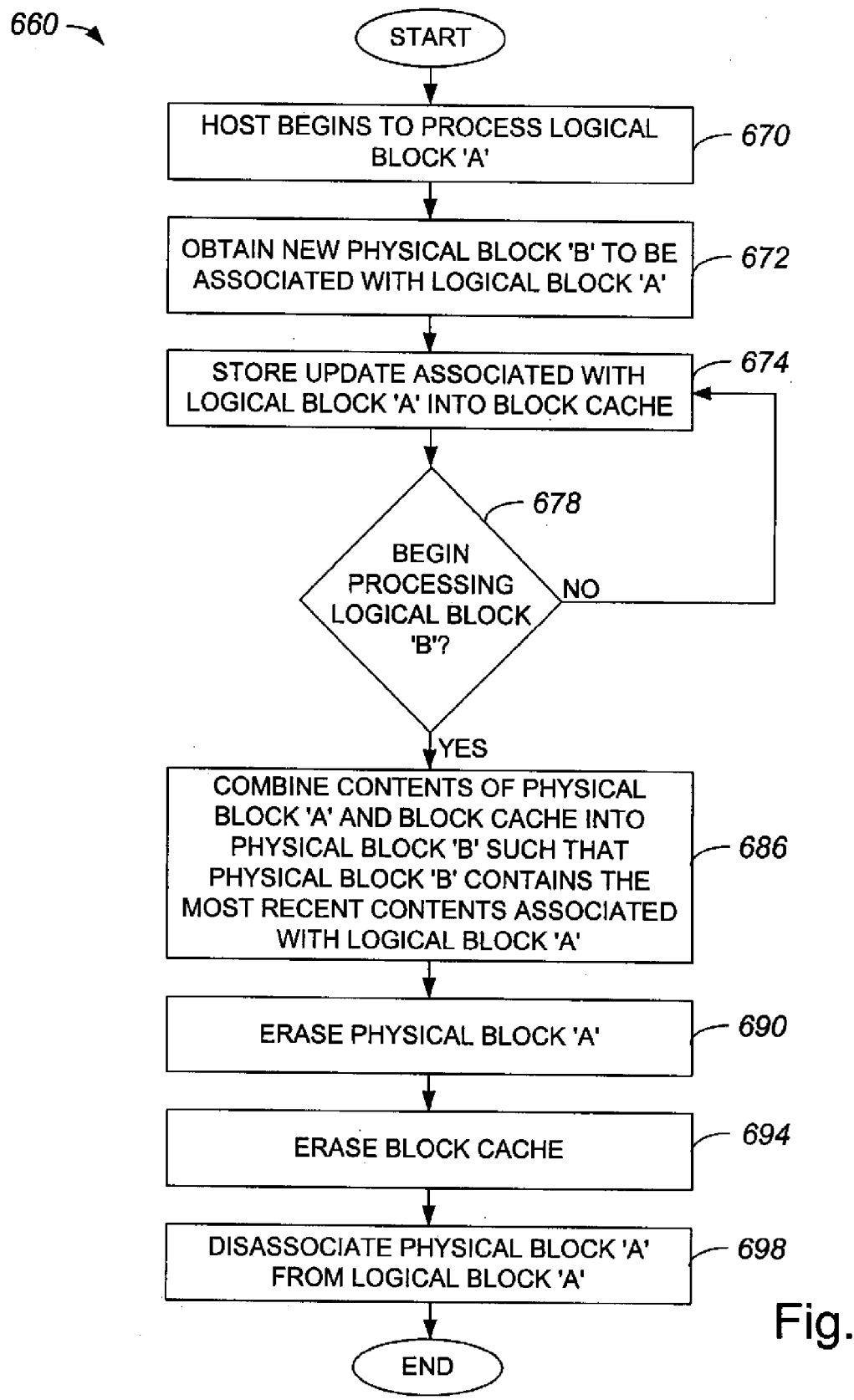

FIG. 7 is a process flow diagram which illustrates the steps associated with one method of updating contents of a page in a physical block domain through the use of a physical block cache in accordance with an embodiment of the present invention.

Figure 8:
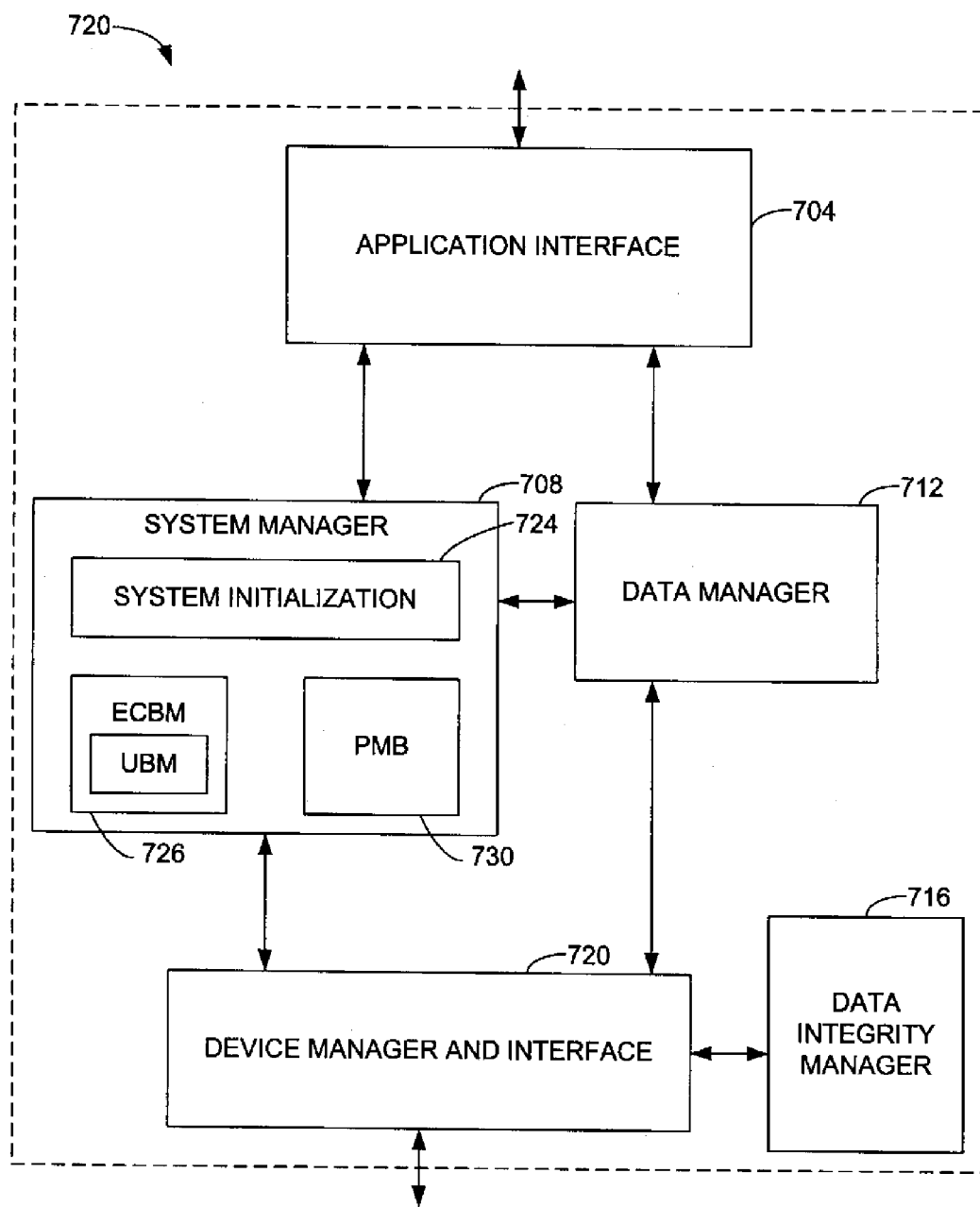

FIG. 8 is a diagrammatic block diagram representation of a system architecture in accordance with an embodiment of the present invention.

Figure 9A:
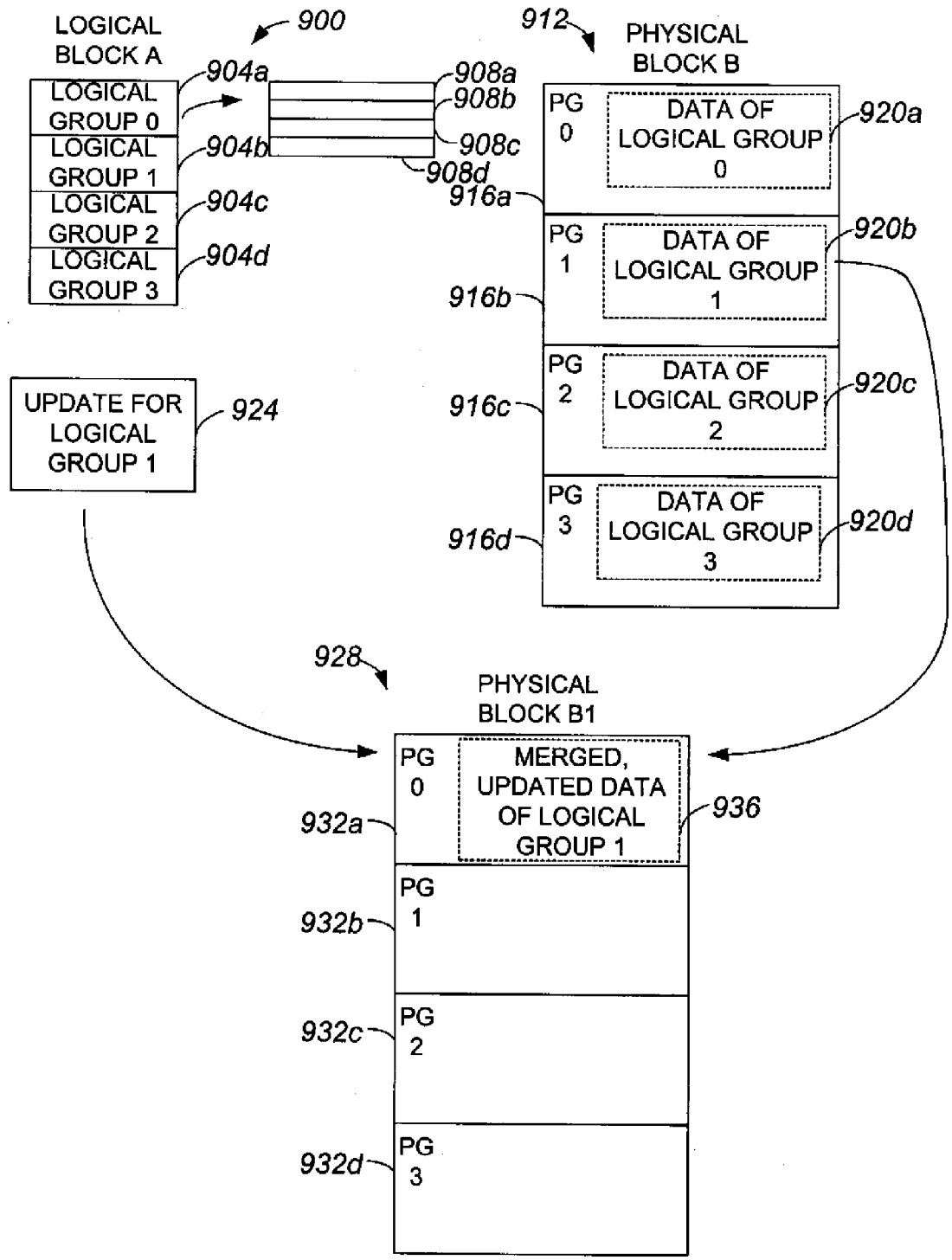

FIG. 9a is a diagrammatic representation of a logical block, a physical block, and a new physical block which are divided into groups in accordance with an embodiment of the present invention.

Figure 9B:
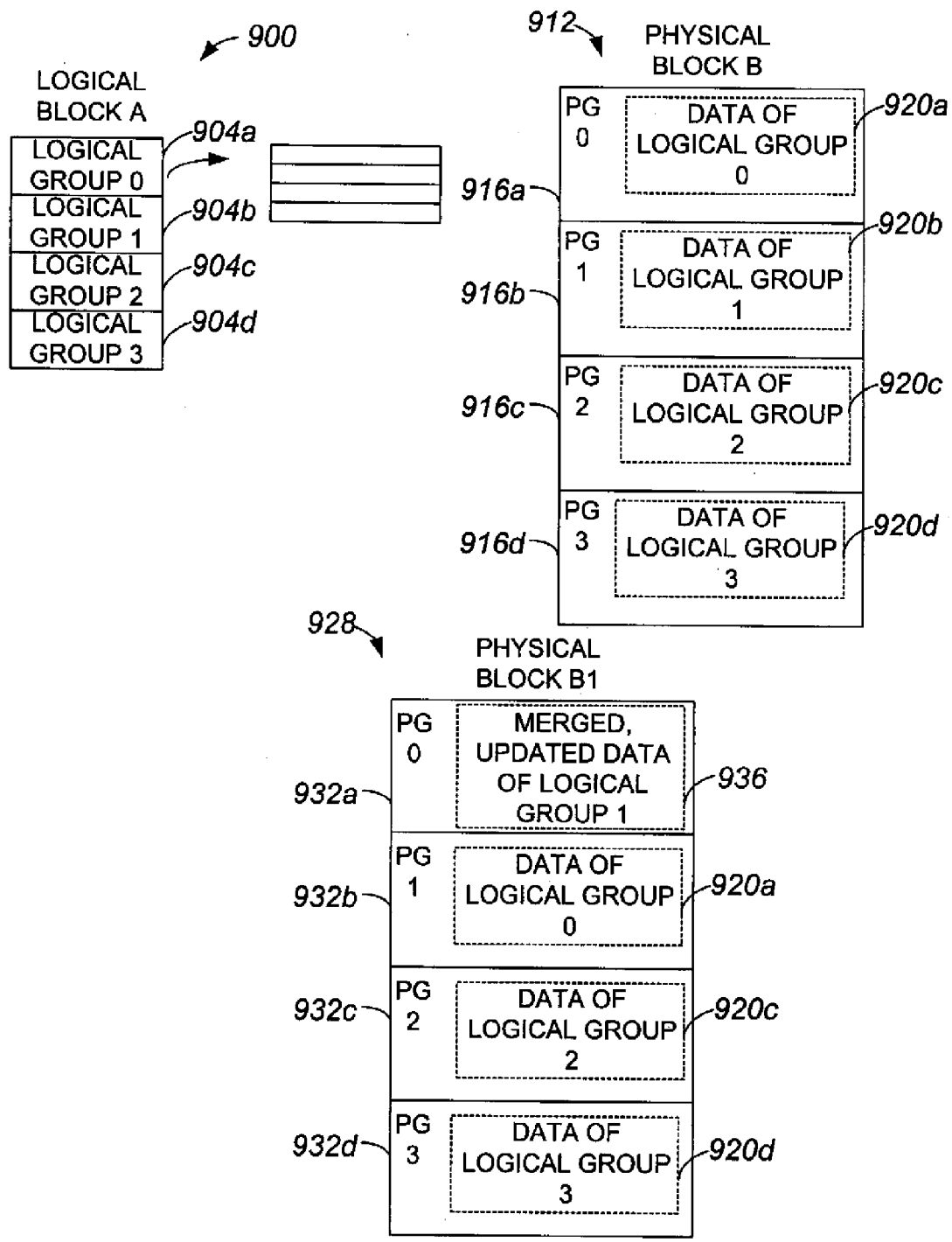

FIG. 9b is a diagrammatic representation of a logical block, a physical block, and a new physical block, i.e., logical block 900, physical block 912, and new physical block 928 of FIG. 9a, in which the new physical block includes the most recent contents associated with the logical block in accordance with an embodiment of the present invention.

Figure 9C:
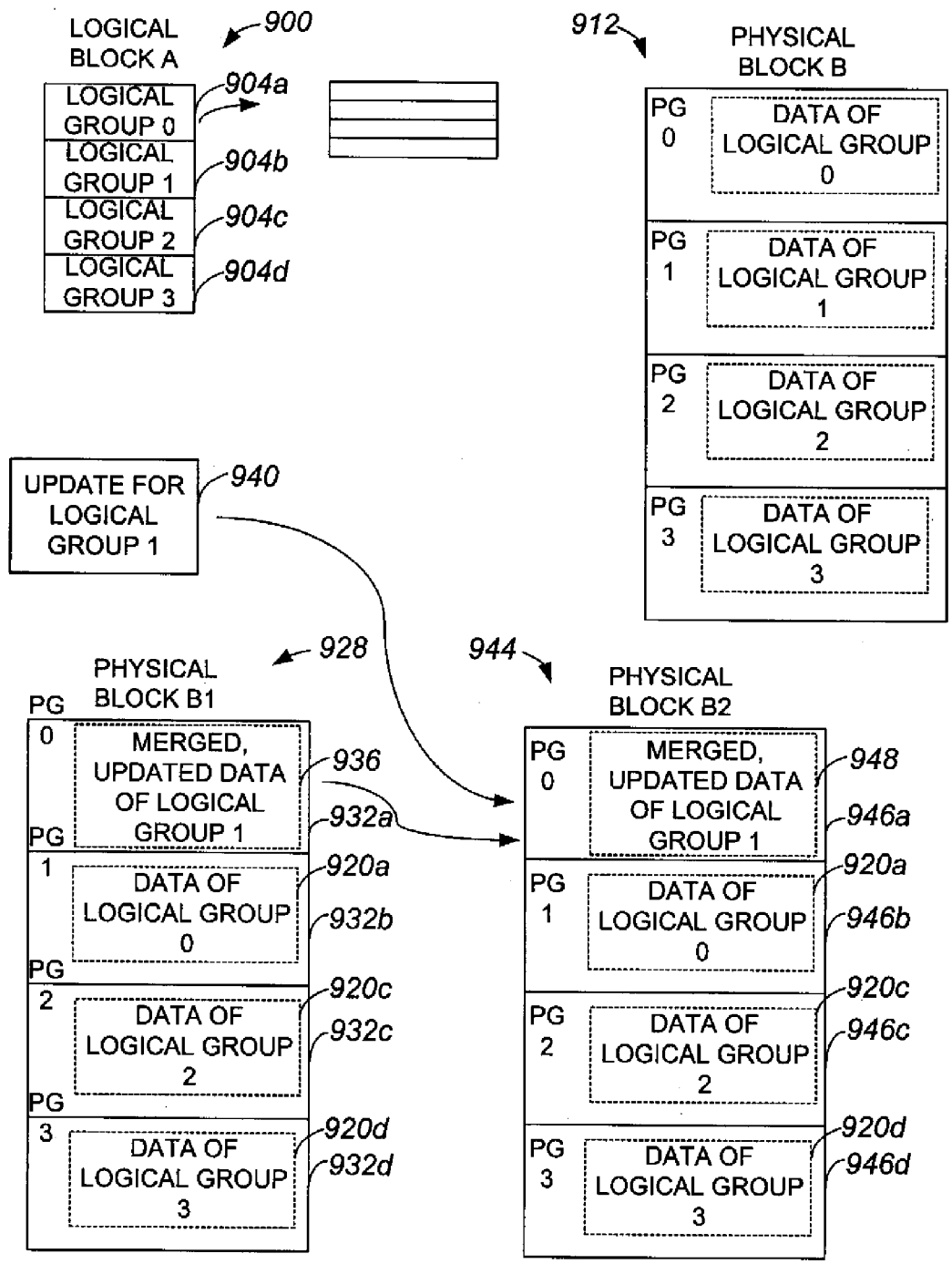

FIG. 9c is a diagrammatic representation of a logical block and a physical block, i.e., logical block 900 and physical block 928 of FIG. 9b, as well as a new physical block in which the new physical block includes the most recent contents associated with the logical block in accordance with an embodiment of the present invention.

Figure 9D:
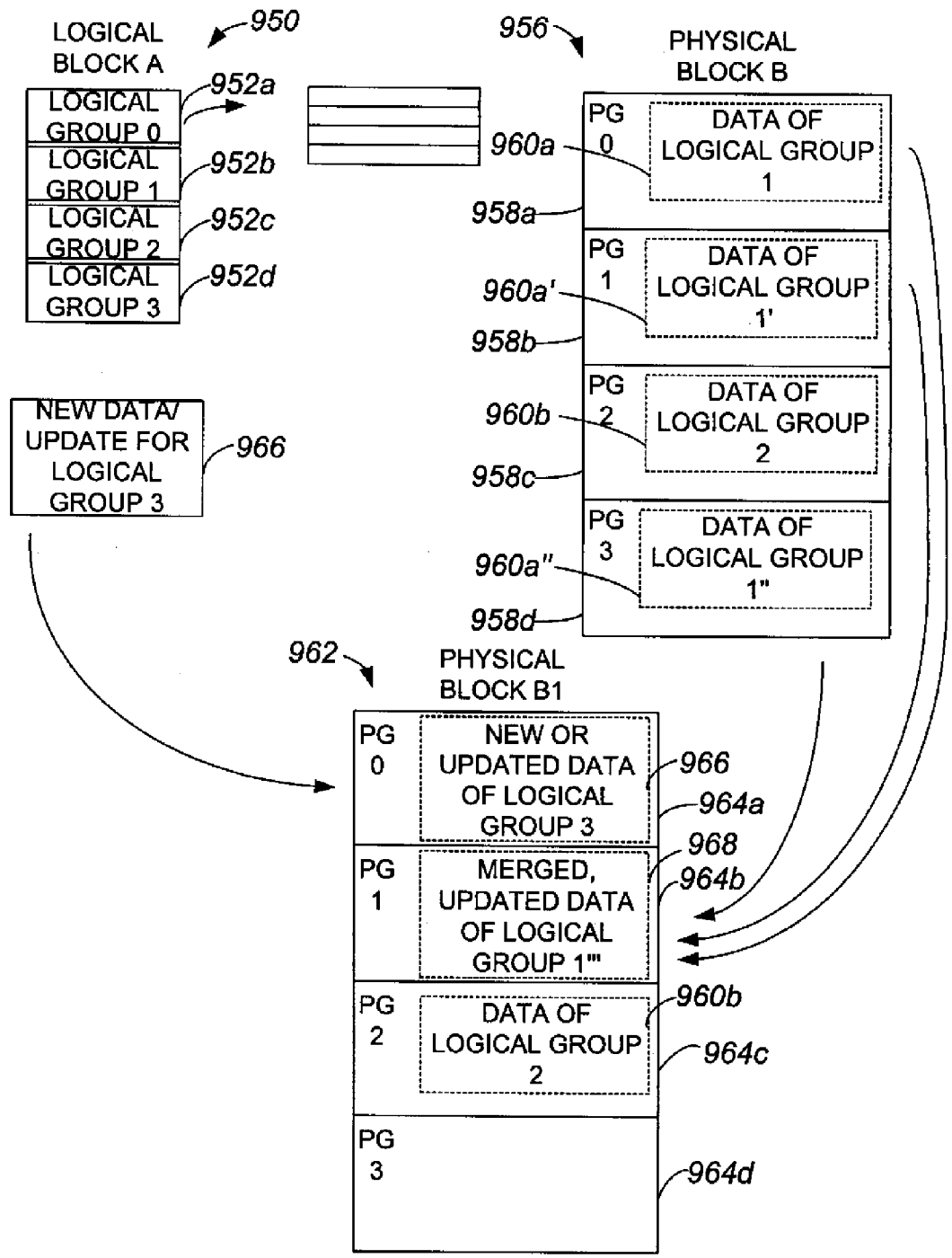

FIG. 9d is a diagrammatic representation of a logical block that is divided into groups, a physical block that includes updated data associated with the logical block, and a new physical block which contains the most recent data associated with the logical block in accordance with an embodiment of the present invention.

Figure 10:
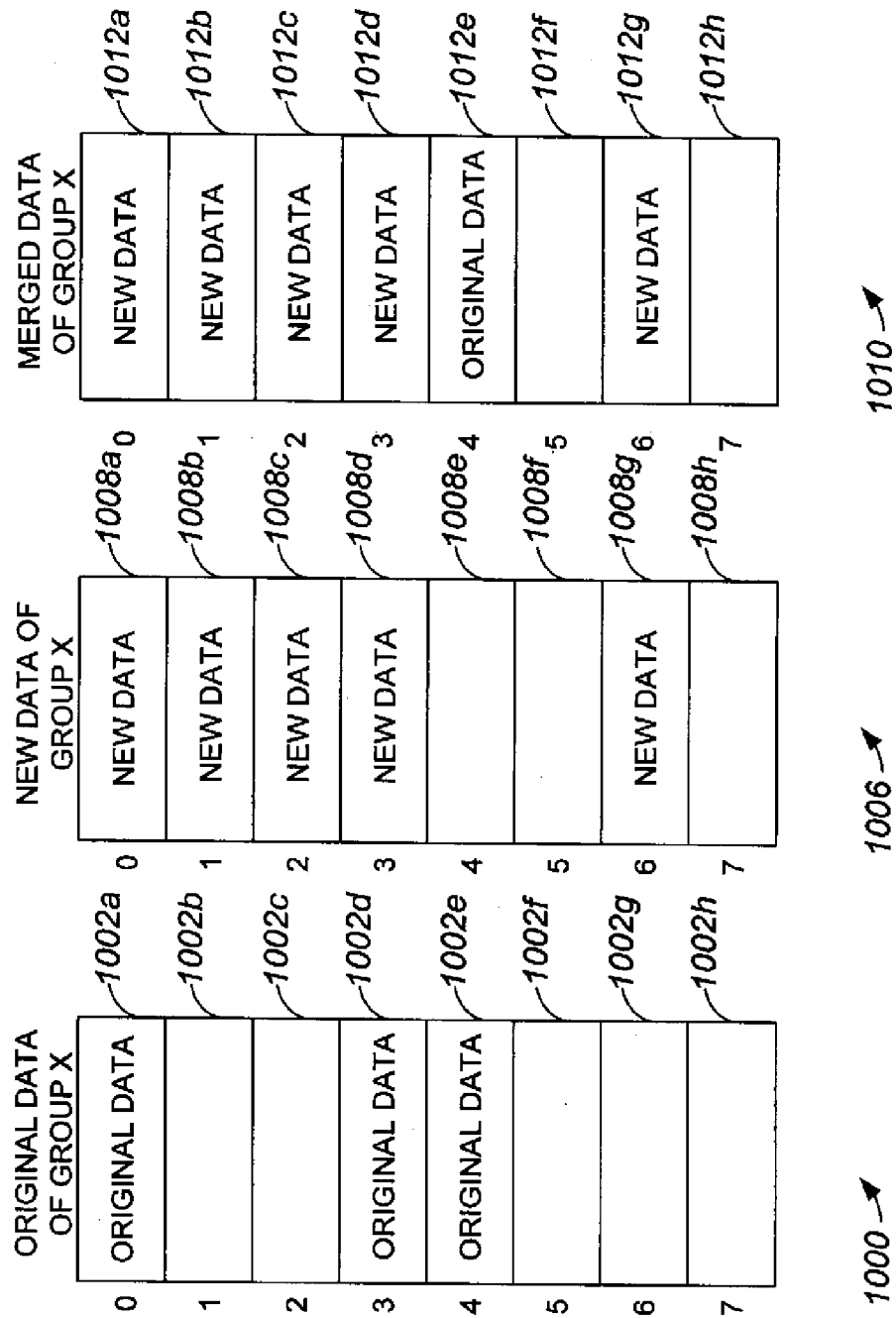

FIG. 10 is a diagrammatic representation of original data of a group, new or updated data for the group, and an amalgamation of the original data and the new or updated data in accordance with an embodiment of the present invention.

Figure 11A:
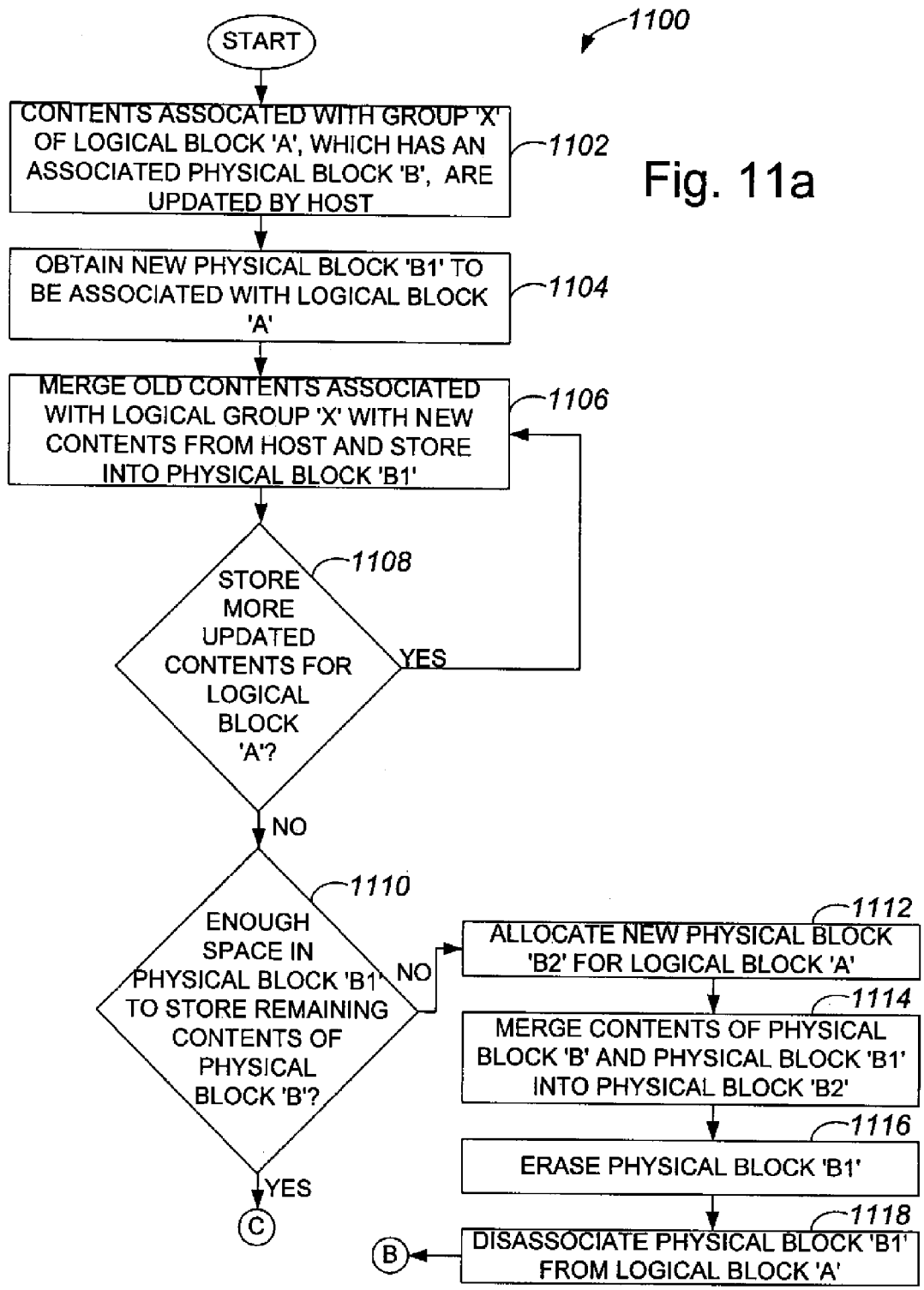
Figure 11B:
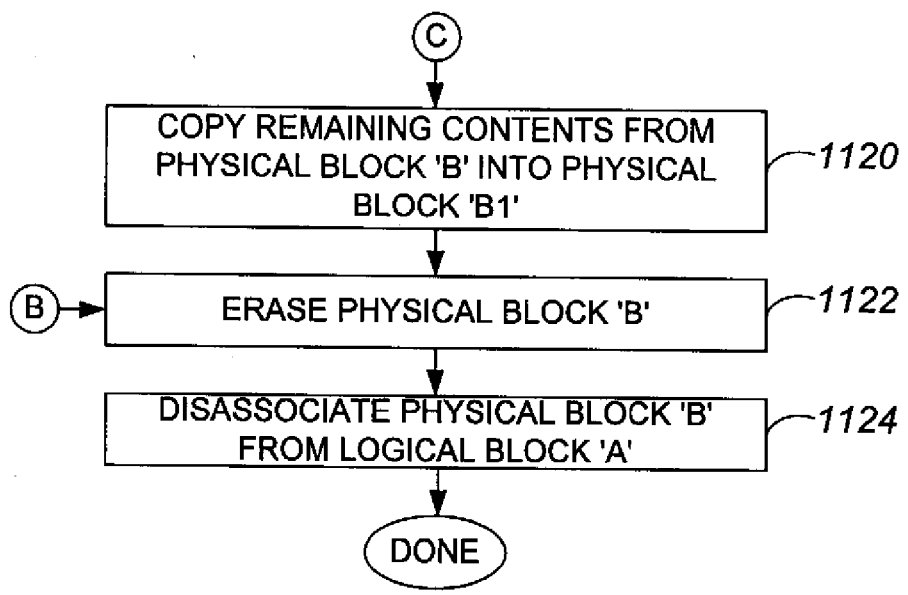

FIGS. 11a and 11b. are a process flow diagram which illustrates the steps associated with one method of updating the contents associated with a logical block that is divided into groups in accordance with an embodiment of the present invention.

Figure 12A:
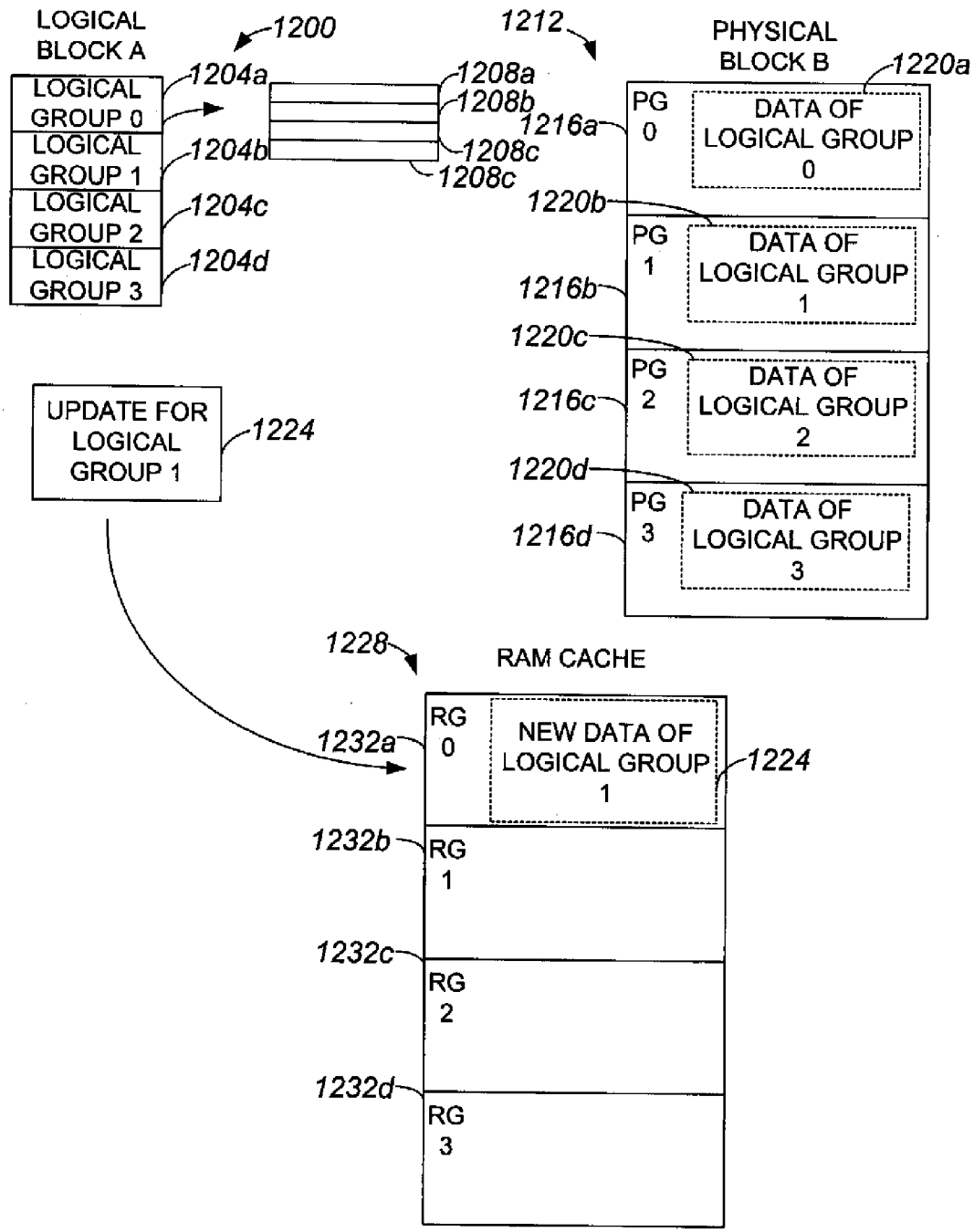

FIG. 12a is a diagrammatic representation of a RAM cache which is effectively divided into groups and is suitable for use in storing updates associated with a logical block which is divided into groups in accordance with an embodiment of the present invention.

Figure 12B:
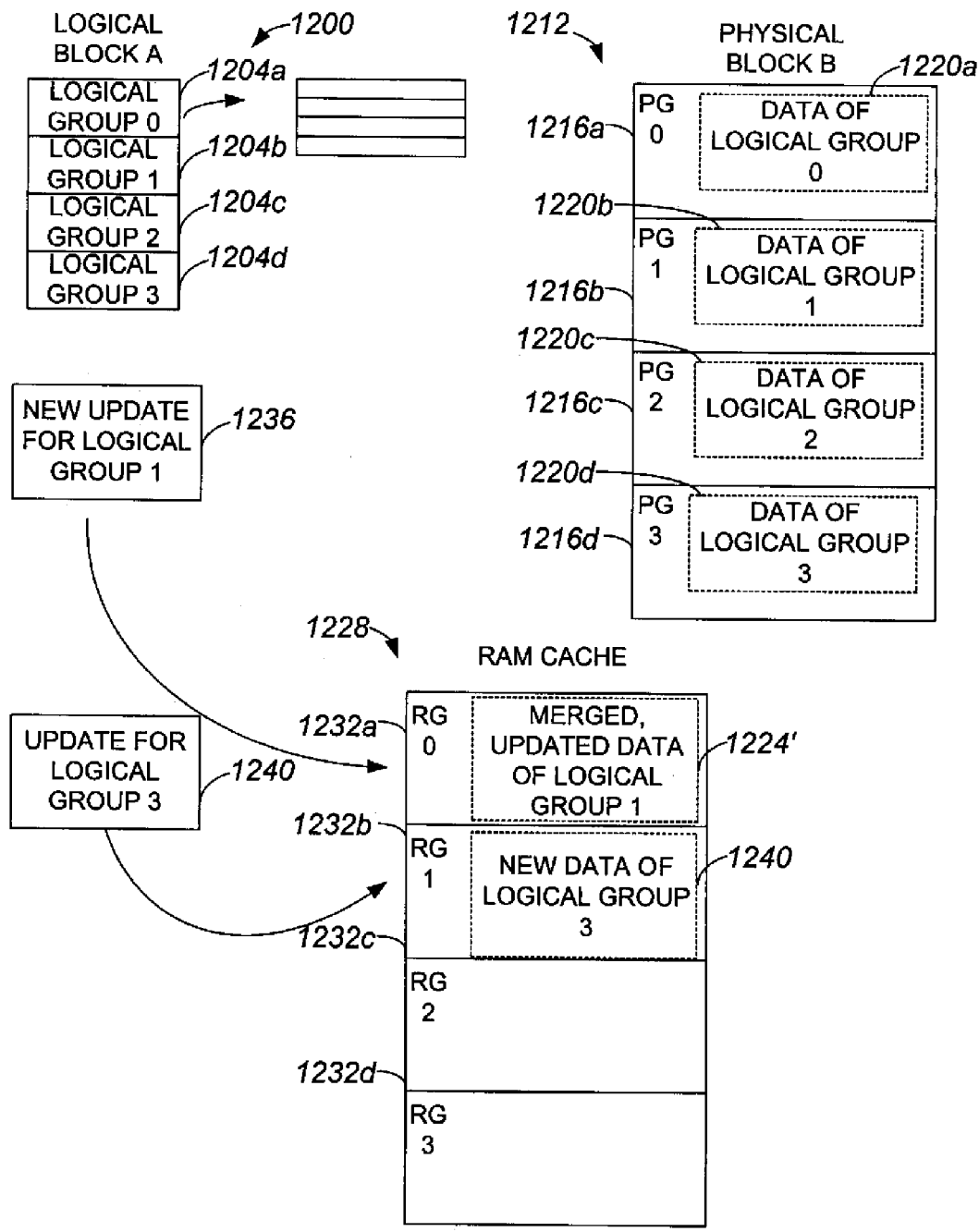

FIG. 12b is a diagrammatic representation of a RAM cache, e.g., RAM cache 1228 of FIG. 12a, in which repeated updates to the same logical group are stored into the same RAM group in accordance with an embodiment of the present invention.

Figure 12C:
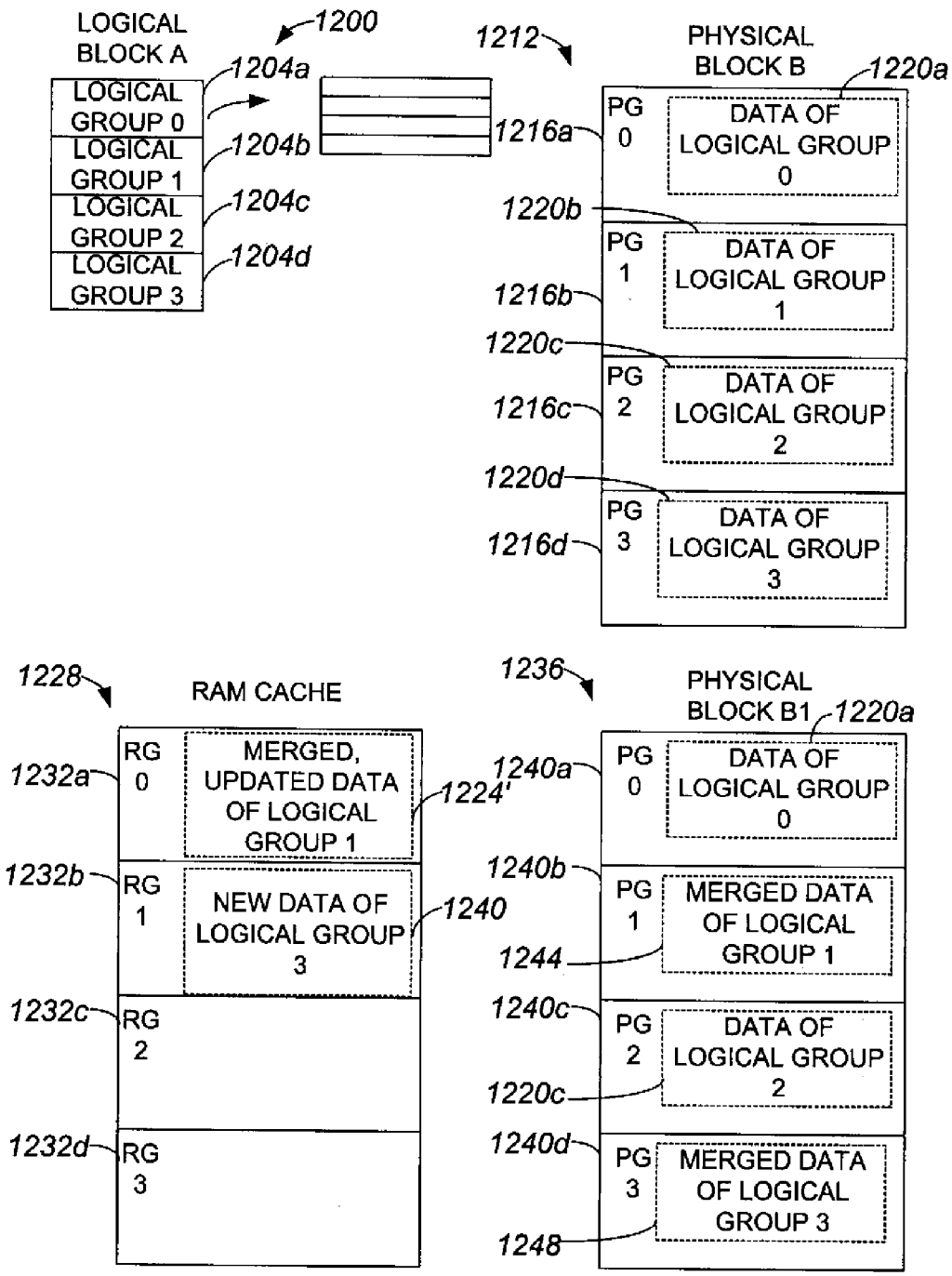

FIG. 12c is a diagrammatic representation of a logical block, i.e., logical block 'A' 1200 of FIG. 12b, and a new physical block after contents of the RAM cache and an original physical block associated with the logical block, i.e., RAM cache 1228 and physical block 'B' 1212 of FIG. 12b, have been merged into the new physical block in accordance with an embodiment of the present invention.

Figure 12D:
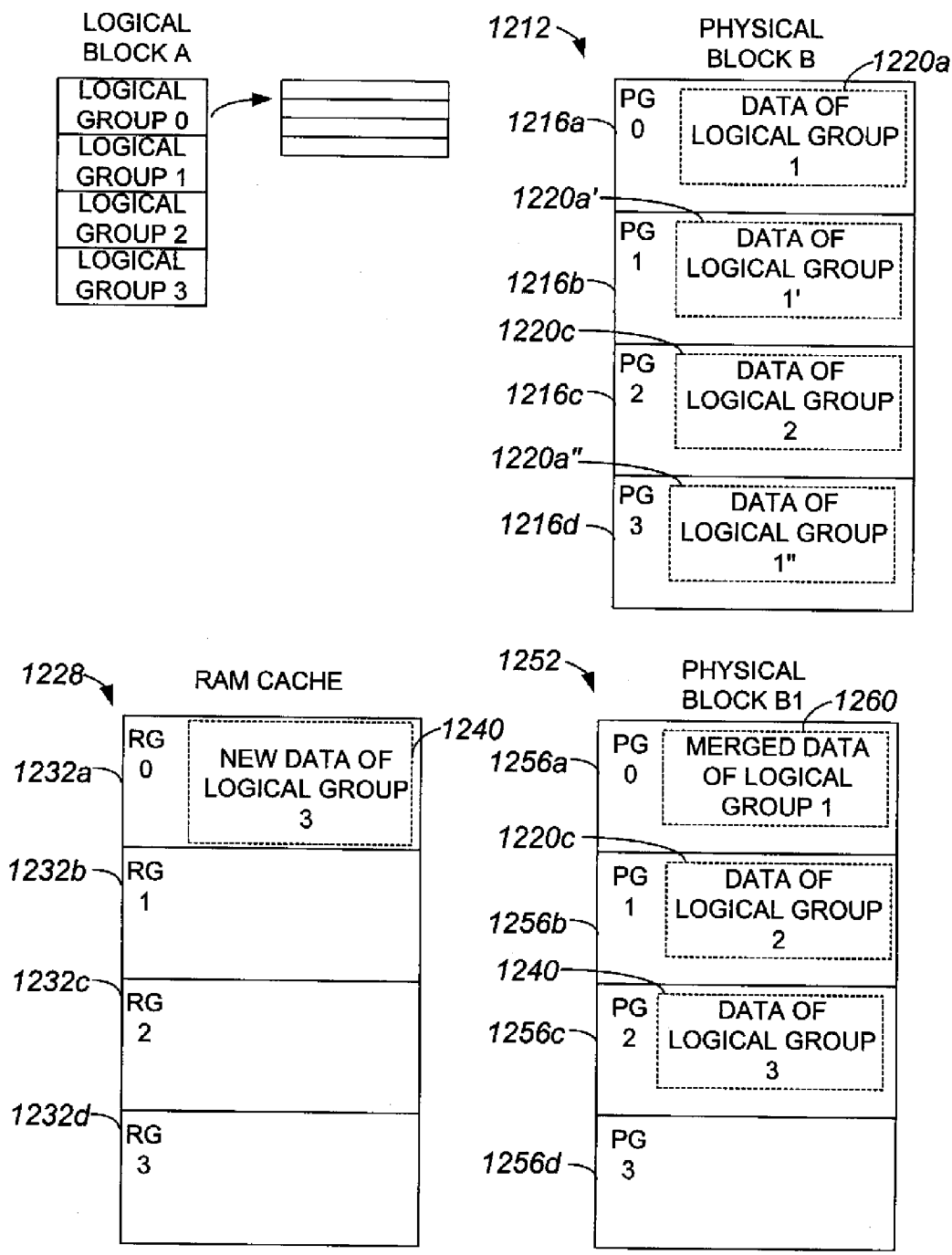

FIG. 12d is a diagrammatic representation of a logical block, a physical block, and a RAM cache in which the contents of the RAM cache exist because there is insufficient space in the physical block to accommodate new data in accordance with an embodiment of the present invention.

Figure 13:
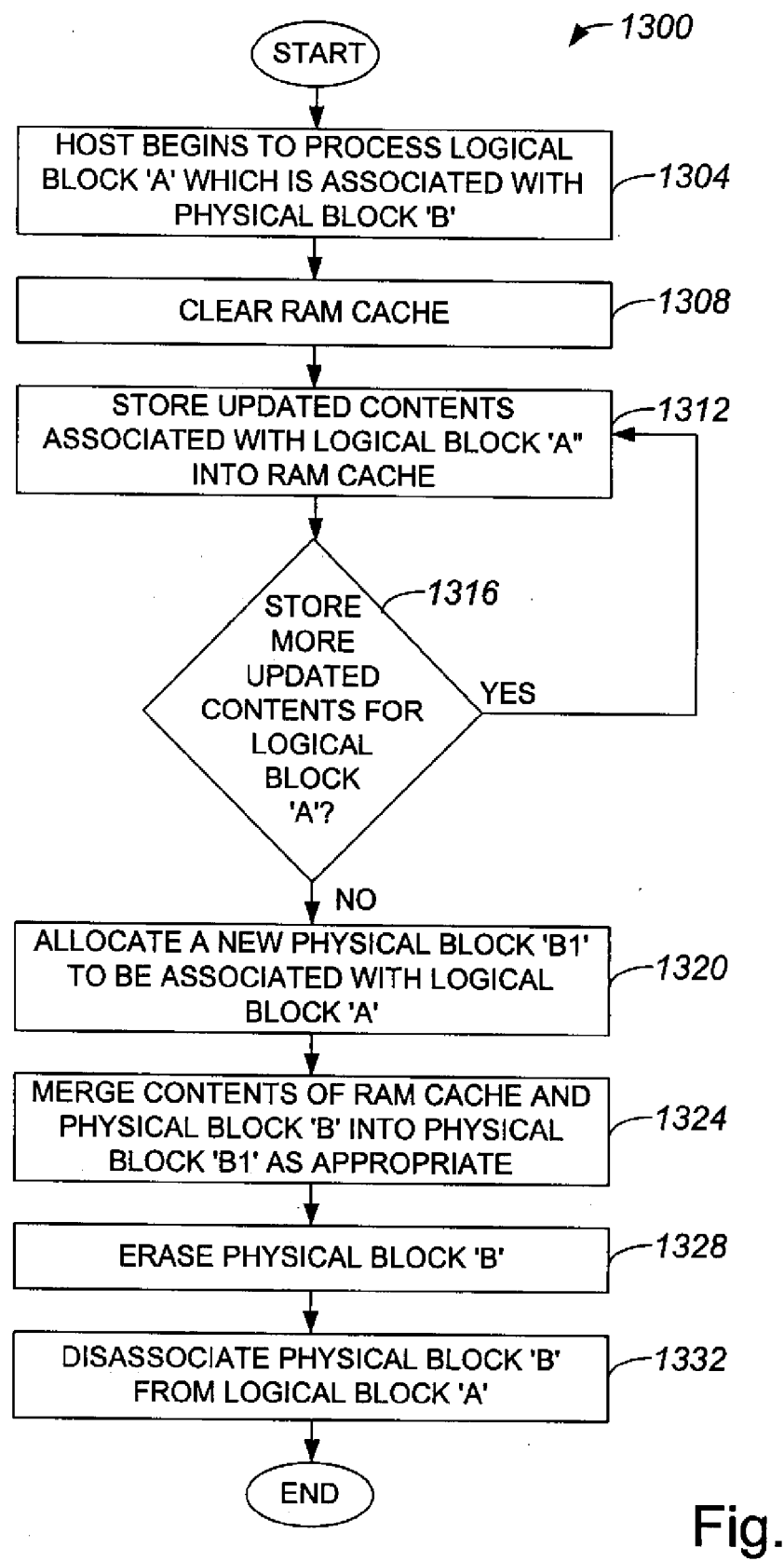

FIG. 13 is a process flow diagram which illustrates one method of using a RAM cache to store updates associated with logical groups of a logical block in accordance with an embodiment of the present invention.

Figure 14A:
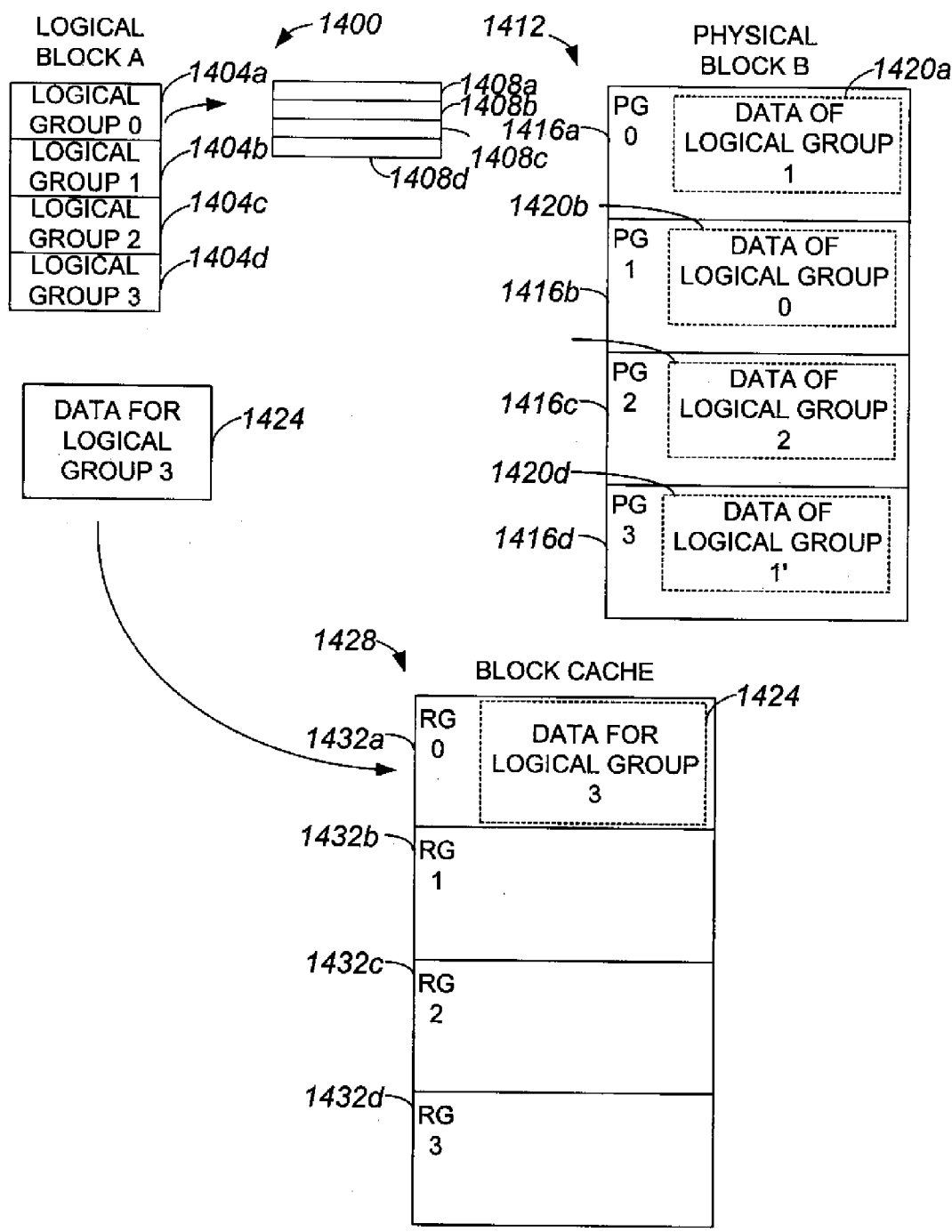

FIG. 14a is a diagrammatic representation of a block cache which is effectively divided into groups and is suitable for use in storing updates associated with a logical block which is divided into groups in accordance with an embodiment of the present invention.

Figure 14B:
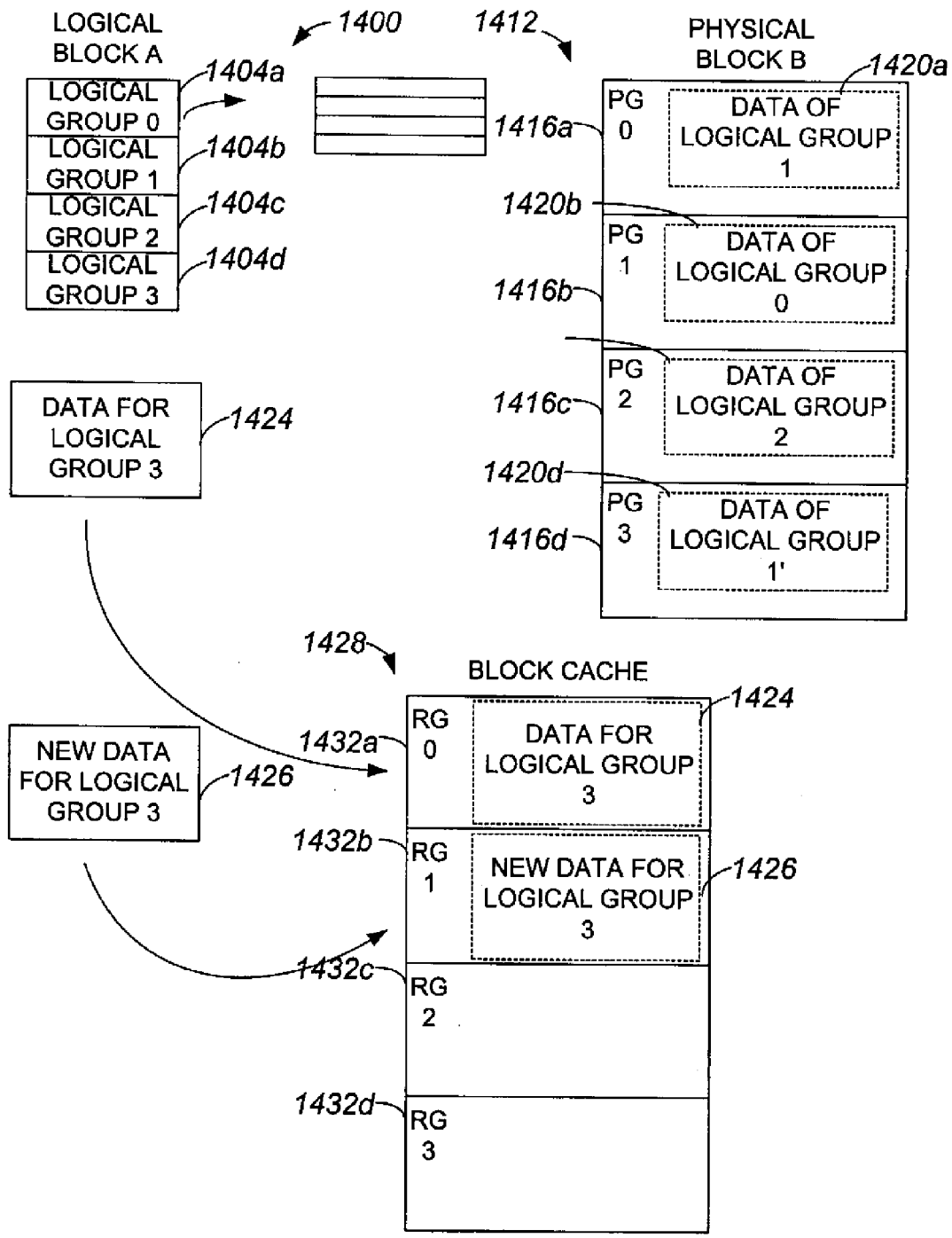

FIG. 14b is a diagrammatic representation of a block cache, e.g., block cache 1428 of FIG. 14a, in which updates to the same logical group are stored in accordance with an embodiment of the present invention.

Figure 14C:
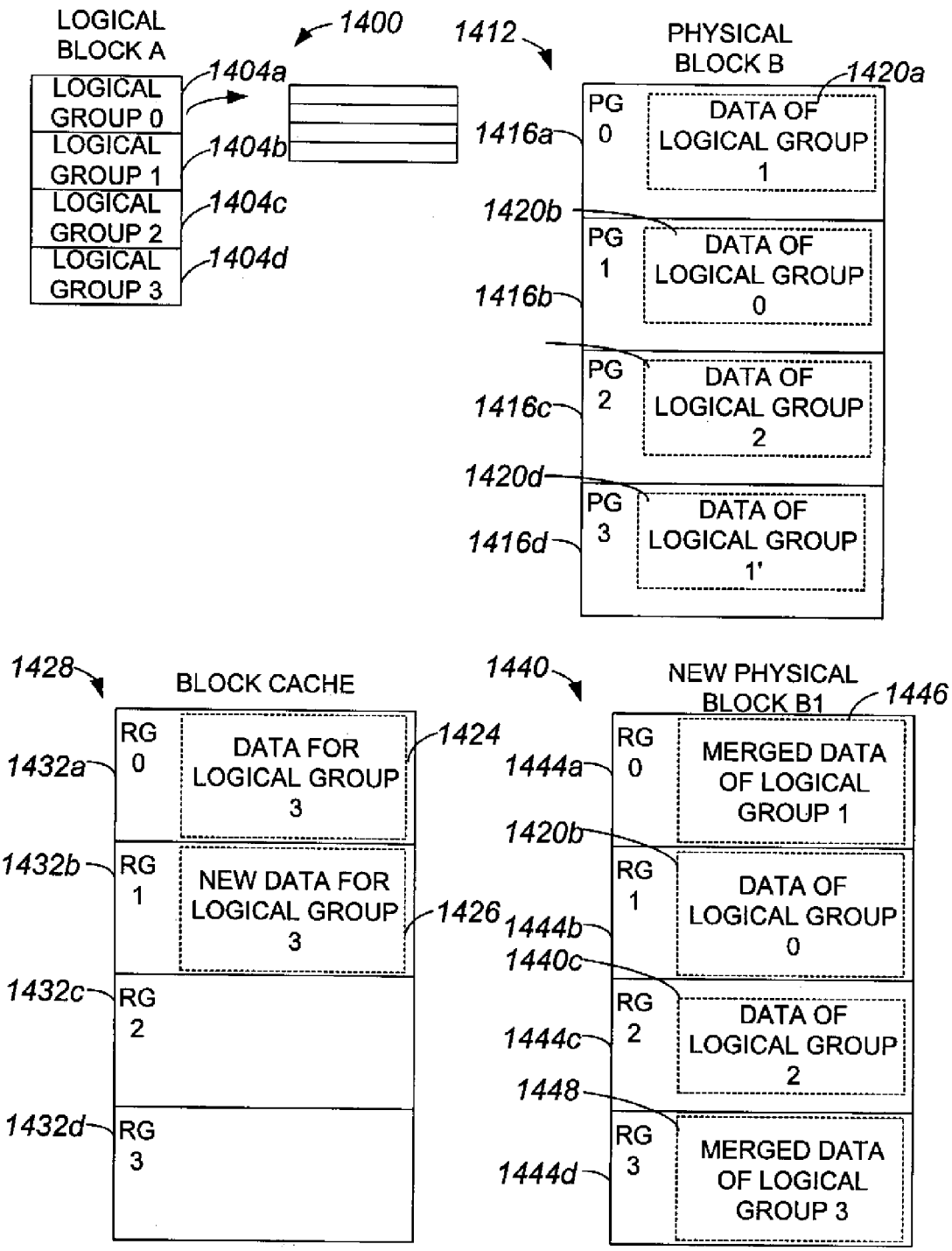

FIG. 14c is a diagrammatic representation of a logical block, i.e., logical block 'A' 1400 of FIG. 14b, and a new physical block after contents of the block cache and an original physical block associated with the logical block, i.e., block cache 1428 and physical block 'B' 1412 of FIG. 14b, have been merged into the new physical block in accordance with an embodiment of the present invention.

Figure 14D:
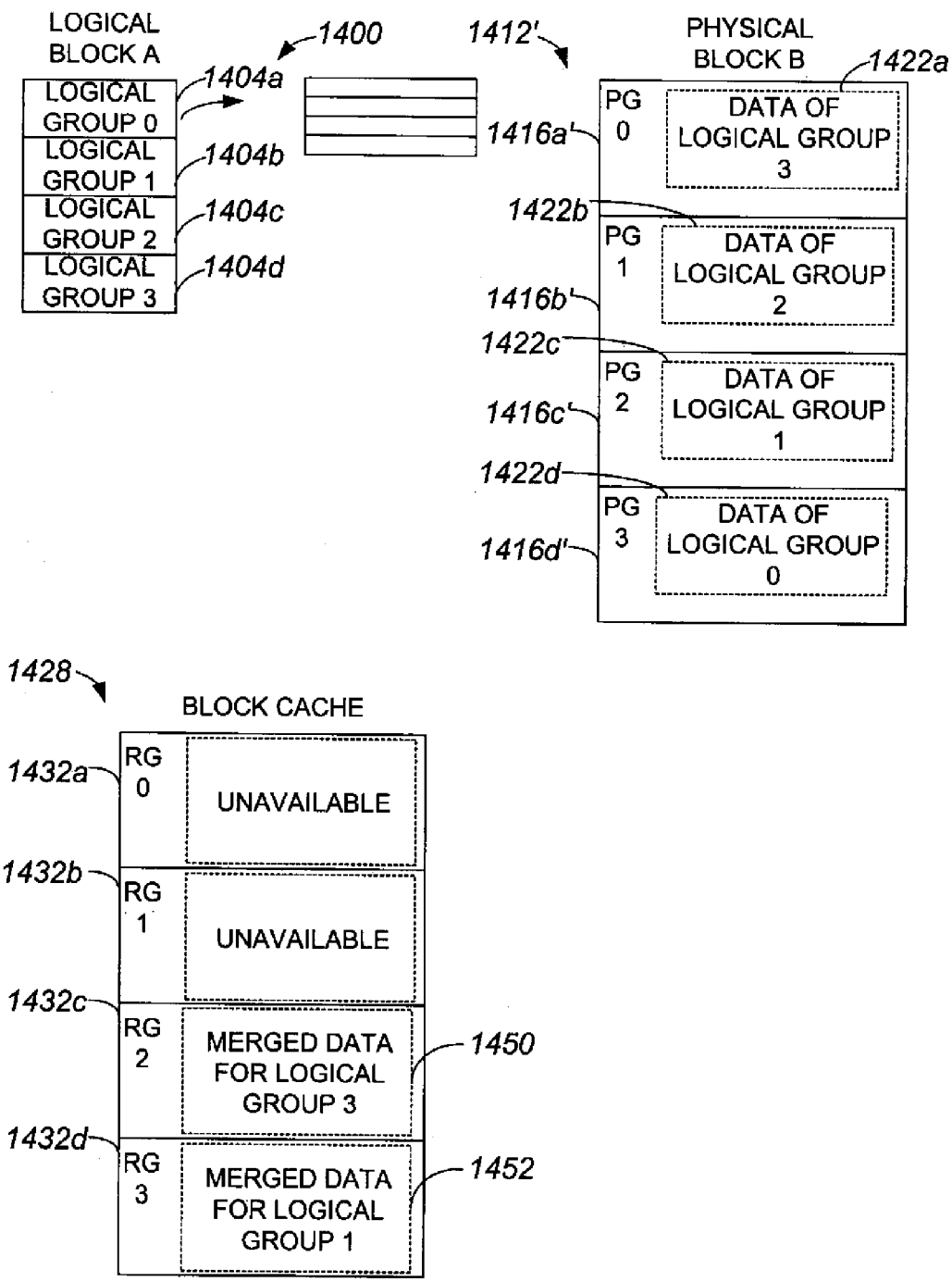

FIG. 14d is a diagrammatic representation of a block cache, e.g., block cache 1428 of FIG. 14c, which includes unavailable groups, in which updates associated with a logical block, e.g., logical block 'A' 1400 of FIG. 14c, may be stored in accordance with an embodiment of the present invention.

Figure 14E:
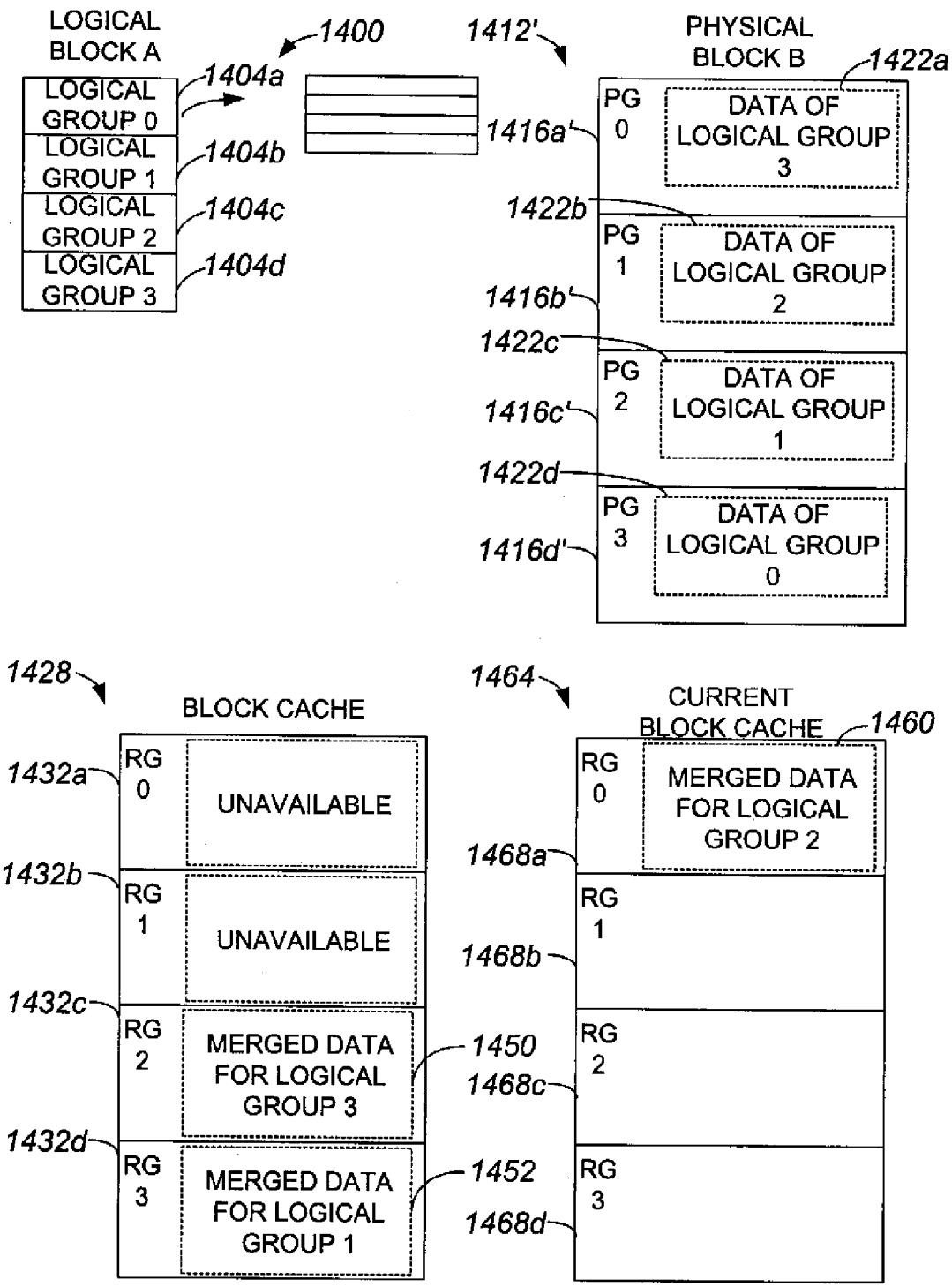

FIG. 14e is a diagrammatic representation of two block caches that may be used to store updates associated with a logical block, e.g., logical block 'A' 1400 of FIG. 14d, in accordance with an embodiment of the present invention.

Figure 14F:
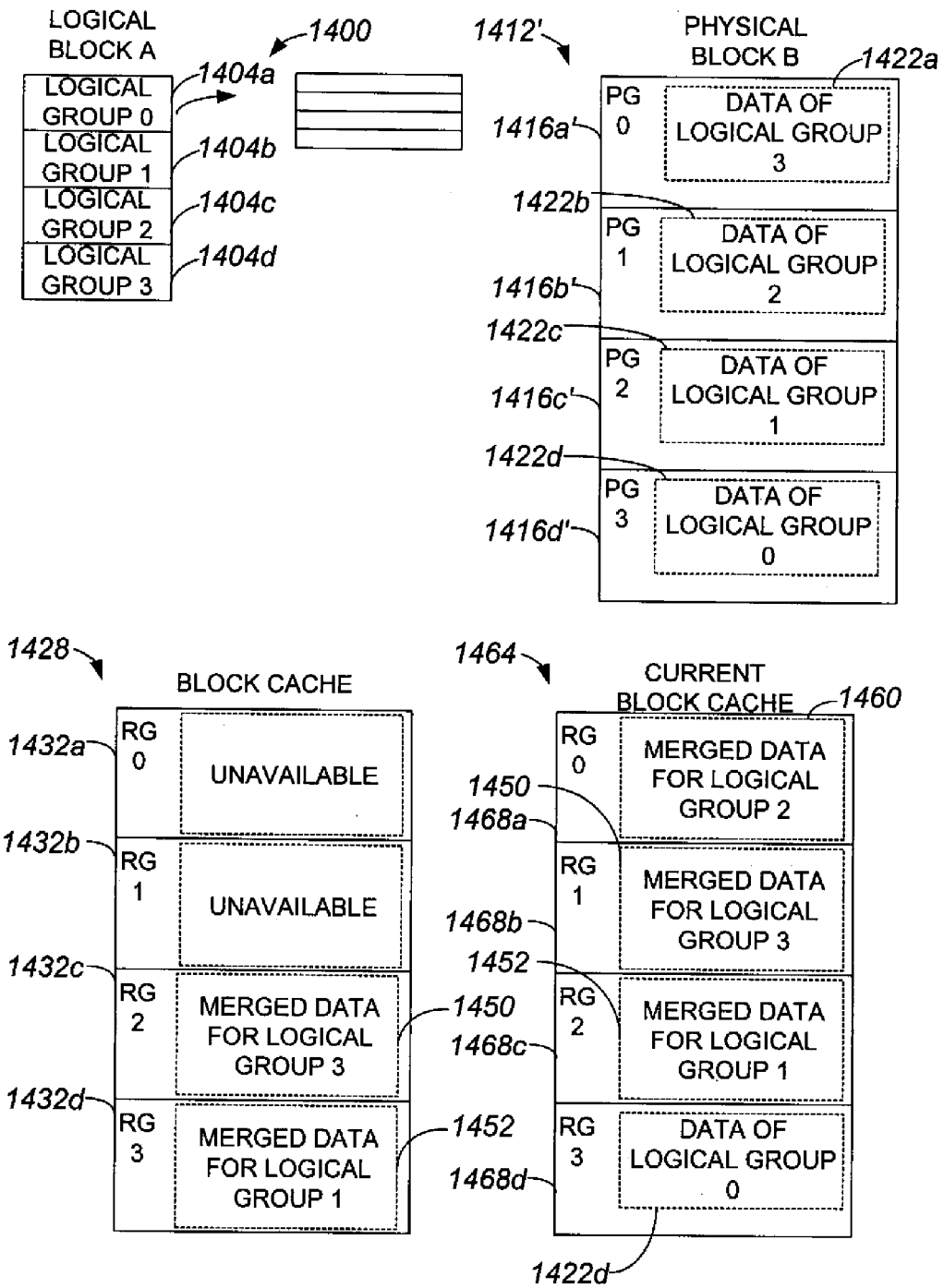

FIG. 14f is a diagrammatic representation of a current block cache, e.g., current block cache 1464 of FIG. 14e, after contents of a block cache and contents of a physical block, e.g., block cache 1428 and contents of physical block 'B' 1412' of FIG. 14e, are merged into the current block cache in accordance with an embodiment of the present invention.

Figure 15A:
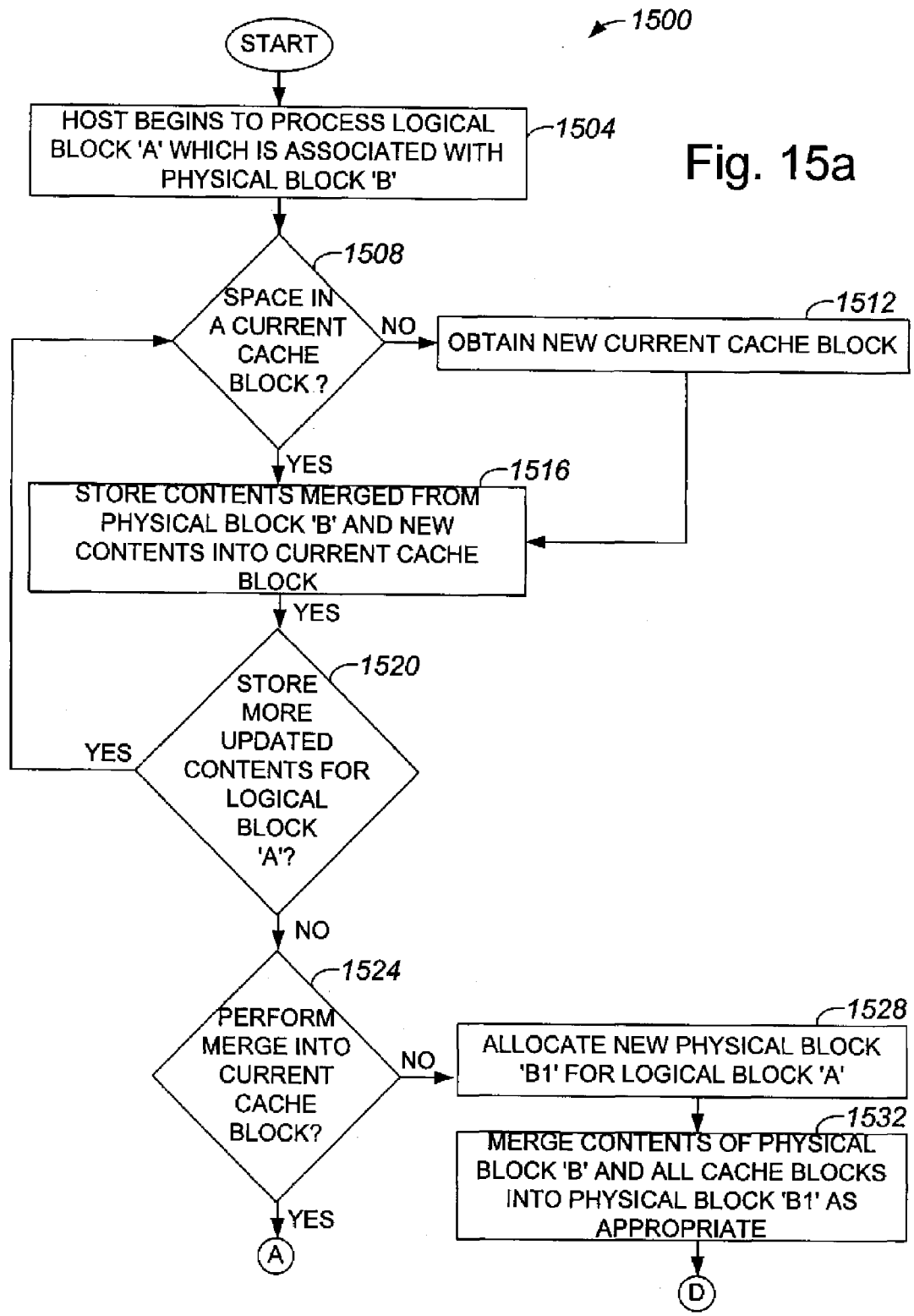
Figure 15B:
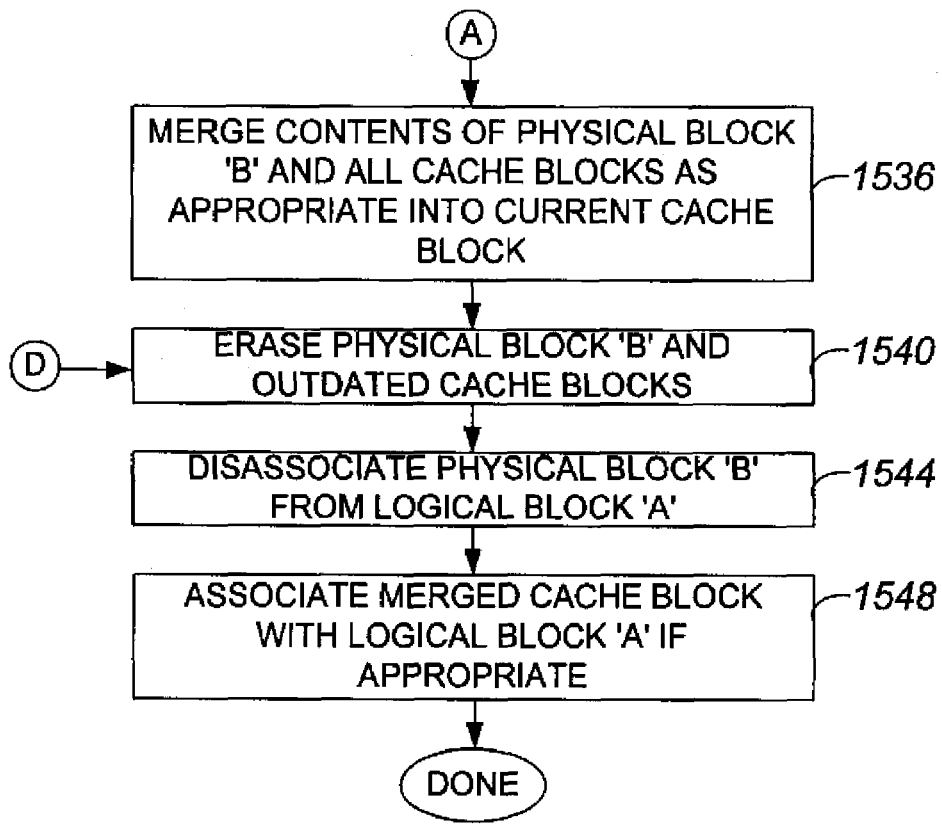

FIGS. 15a and 15b are a process flow diagram which illustrates the steps associated with one method of storing updated contents in a block cache which uses groups in accordance with an embodiment of the present invention.

DETAILED DESCRIPTION OF THE EMBODIMENTS

Processes of writing to physical blocks and erasing physical blocks are relatively time consuming, and may use significant computational overhead. As such, when writing and erasing occurs relatively frequently, the overall performance of a system which includes the physical blocks may be adversely affected. Each time a logical page of a logical block is to be updated, if a first physical block which is mapped to the logical block is substantially full, the update and some contents of the first physical block may be written into a new physical block while the first physical block is erased. When there are many pages to be updated with respect to the logical block, there may be a substantially constant erasing of physical blocks, obtaining of new physical blocks, and writing of data into the new physical blocks. When physical blocks are effectively constantly written or erased, the performance of a memory system which includes the blocks may be degraded.

In a situation in which logical pages in a single logical block are constantly updated, there may be a substantial amount of time and overhead that is spent writing to and erasing physical blocks which correspond to the logical block. Specifically, when a single logical page in a logical block is repeatedly updated, performing updates in a "physical block domain" for each update to the logical page may be particularly wasteful when the "logical block domain" is constantly changing, since updates in the physical block domain may be repeatedly overwritten. Waiting to update a physical block until substantially all updates to a logical block have been completed for the time being enables the number of write and erase operations to be reduced. Hence, the performance of a memory system may be improved.

The use of a caching process to cache updates to a logical block or new data associated with a logical block enables updates to be temporarily stored until substantially all updates to the logical block or new data additions to the logical block are completed for the time being. Once it is effectively known that there are no more updates or new data additions to be made to the logical block, at least until after other logical blocks are processed, or when the cache is full, at least some cached updates and new data may be copied along with any appropriate contents of an original physical block which is mapped to the logical block such that the most recent contents associated with the logical block are written into a new physical block. When the new physical block has been written to, the original physical block may be erased. As a result, the number of write operations and read operations associated with processing a plurality of updates or new additions may be reduced. Herein and after, for ease of discussion, updates will generally encompass new contents. Similarly, updating contents in a block will generally encompass adding new contents to the block.

When software requirements of a system are such that memory such as random access memory (RAM) is available, a cache may be a RAM cache. The use of a RAM cache typically enables writing processes to occur efficiently. In one embodiment, however, if there is an insufficient amount of RAM available, a cache may be a block cache. That is, a cache may be a physical block.

Figure 1:
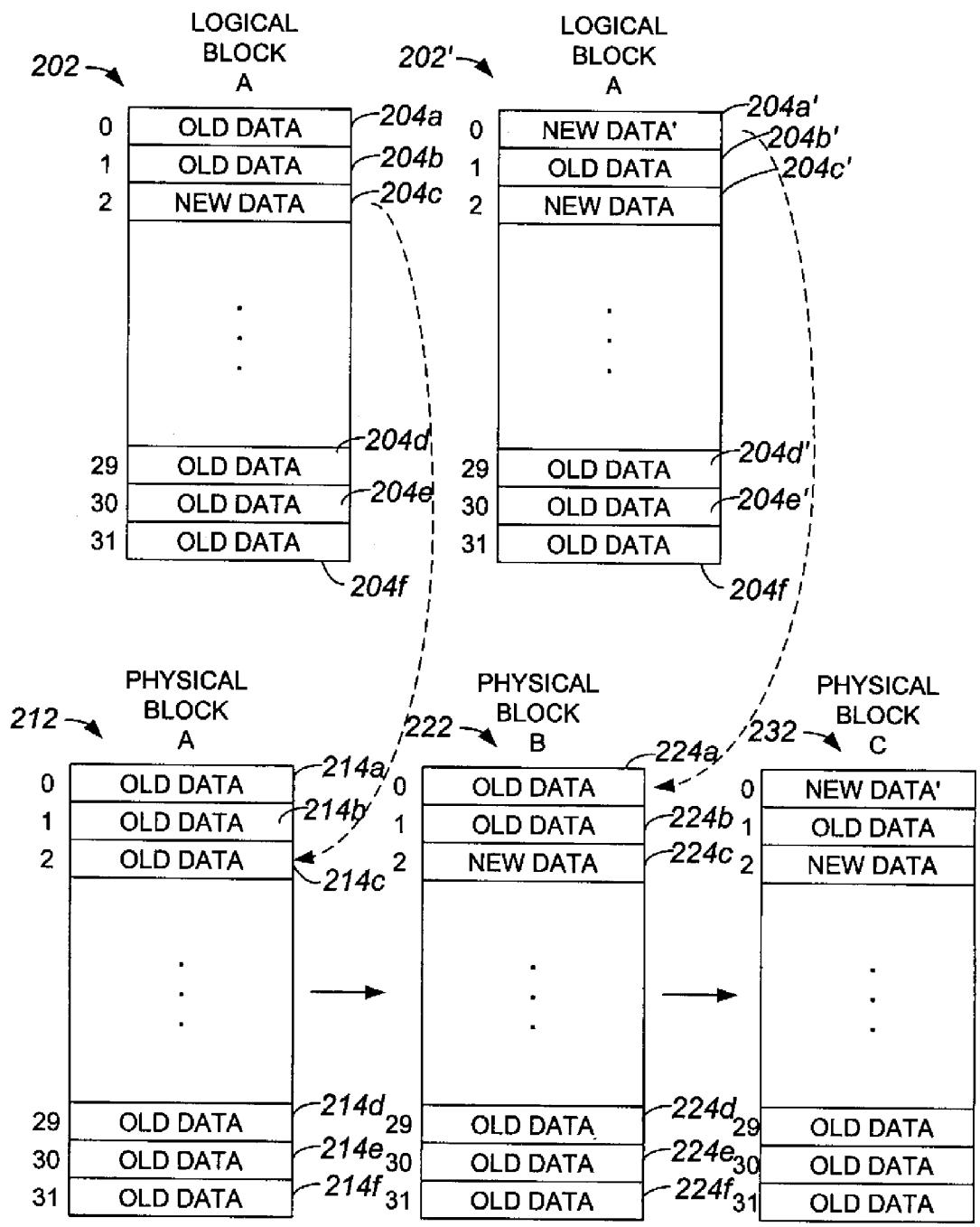
FIG. 1 is a diagrammatic representation of a logical block with updated contents and physical blocks which may be obtained to accommodate the updated contents.
Figure 2:
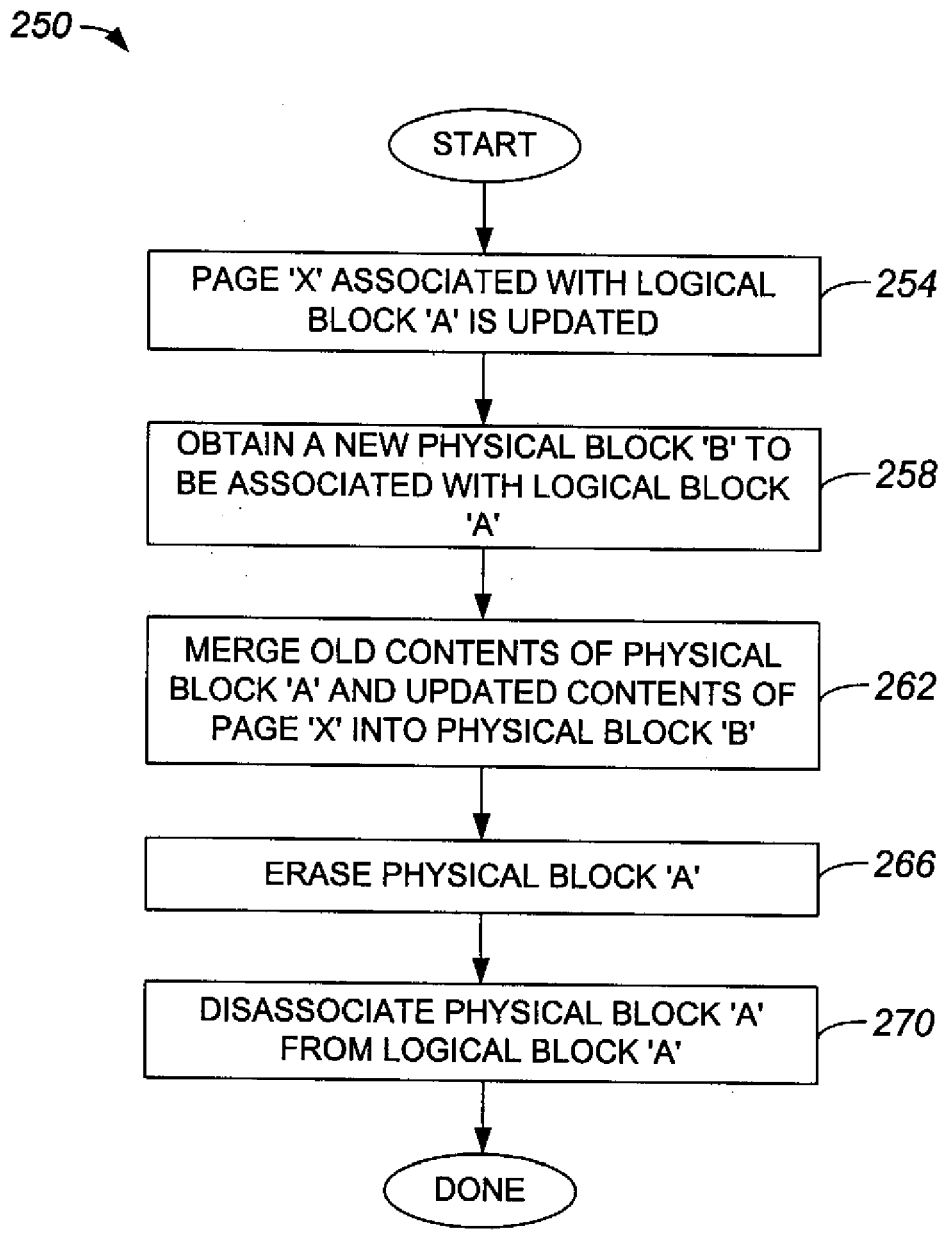
FIG. 2 is a process flow diagram which illustrates the steps associated with one method of writing updated contents of a page associated with a logical block into a physical block.
Figure 3A:
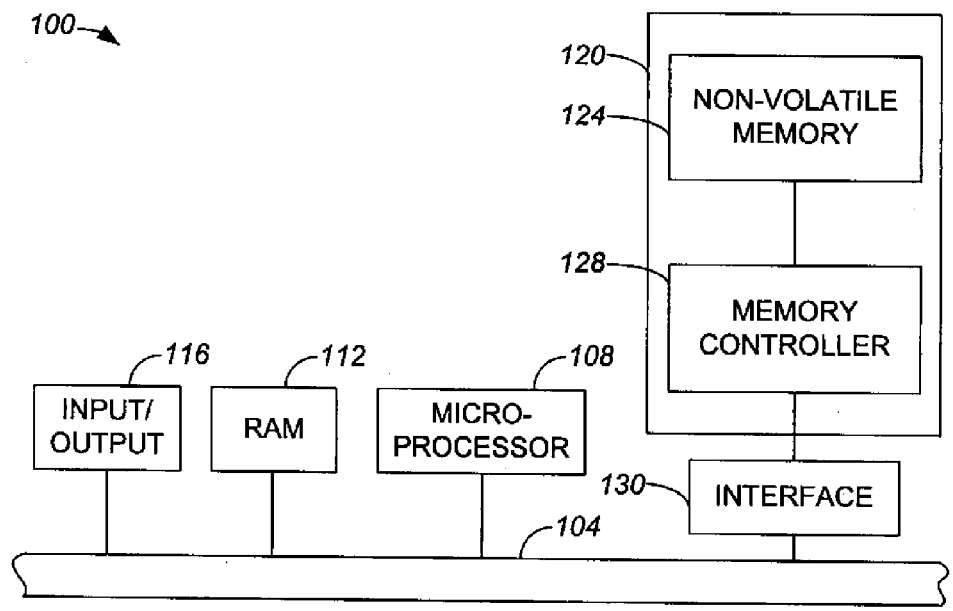
FIG. 3a is a diagrammatic representation of a general host system which includes a non-volatile memory.

Flash memory systems or, more generally, non-volatile memory devices which may benefit from the use of a RAM cache or a block cache to temporarily cache updated data before writing the updated data into a physical block. Typically, flash memory systems are used in conjunction with a host system such that the host system may write data to or read data from the flash memory systems. However, some flash memory systems include embedded flash memory and software which executes on a host to substantially act as a controller for the embedded flash memory, as will be discussed below with respect to FIG. 3c. Referring to FIG. 3a, a general host system which includes a non-volatile memory device, e.g., a CompactFlash memory card, will be described. A host or computer system 100 generally includes a system bus 104 which allows a microprocessor 108, a random access memory (RAM) 112, and input/output circuits 116 to communicate. It should be appreciated that host system 100 may generally include other components, e.g., display devices and networking device, which are not shown for purposes of illustration.

In general, host system 100 may be capable of capturing information including, but not limited to, still image information, audio information, and video image information. Such information may be captured in real-time, and may be transmitted to host system 100 in a wireless manner. While host system 100 may be substantially any system, host system 100 is typically a system such as a digital camera, a video camera, a cellular communications device, an audio player, or a video player. It should be appreciated, however, that host system 100 may generally be substantially any system which stores data or information, and retrieves data or information.

Host system 100 may also be a system which either only captures data, or only retrieves data. That is, host system 100 may be, in one embodiment, a dedicated system which stores data, or host system 100 may be a dedicated system which reads data. By way of example, host system 100 may be a memory writer which is arranged only to write or store data. Alternatively, host system 100 may be a device such as an MP3 player which is typically arranged to read or retrieve data, and not to capture data.

A non-volatile memory device 120 which, in one embodiment, is a removable non-volatile memory device, is arranged to interface with bus 104 to store information. An optional interface block 130 may allow non-volatile memory device 120 to interface indirectly with bus 104. When present, input/output circuit block 116 serves to reduce loading on bus 104, as will be understood by those skilled in the art. Non-volatile memory device 120 includes non-volatile memory 124 and an optional memory control system 128. In one embodiment, non-volatile memory device 120 may be implemented on a single chip or a die. Alternatively, non-volatile memory device 120 may be implemented on a multi-chip module, or on multiple discrete components which may form a chip set and may be used together as non-volatile memory device 120. One embodiment of non-volatile memory device 120 will be described below in more detail with respect to FIG. 3b.

Non-volatile memory 124, e.g., flash memory such as NAND flash memory, is arranged to store data such that data may be accessed and read as needed. Data stored in non-volatile memory 124 may also be erased as appropriate, although it should be understood that some data in non-volatile memory 124 may not be erasable. The processes of storing data, reading data, and erasing data are generally controlled by memory control system 128 or, when memory control system 128 is not present, by software executed by microprocessor 108. The operation of non-volatile memory 124 may be managed such that the lifetime of non-volatile memory 124 is substantially maximized by essentially causing sections of non-volatile memory 124 to be worn out substantially equally.

Non-volatile memory device 120 has generally been described as including an optional memory control system 128, i.e., a controller. Often, non-volatile memory device 120 may include separate chips for non-volatile memory 124 and memory control system 128, i.e., controller, functions. By way of example, while non-volatile memory devices including, but not limited to, PC cards, CompactFlash cards, MultiMedia cards, and Secure Digital cards include controllers which may be implemented on a separate chip, other non-volatile memory devices may not include controllers that are implemented on a separate chip. In an embodiment in which non-volatile memory device 120 does not include separate memory and controller chips, the memory and controller functions may be integrated into a single chip, as will be appreciated by those skilled in the art. Alternatively, the functionality of memory control system 128 may be provided by microprocessor 108, as for example in an embodiment in which non-volatile memory device 120 does not include memory controller 128, as discussed above.

Figure 3B:
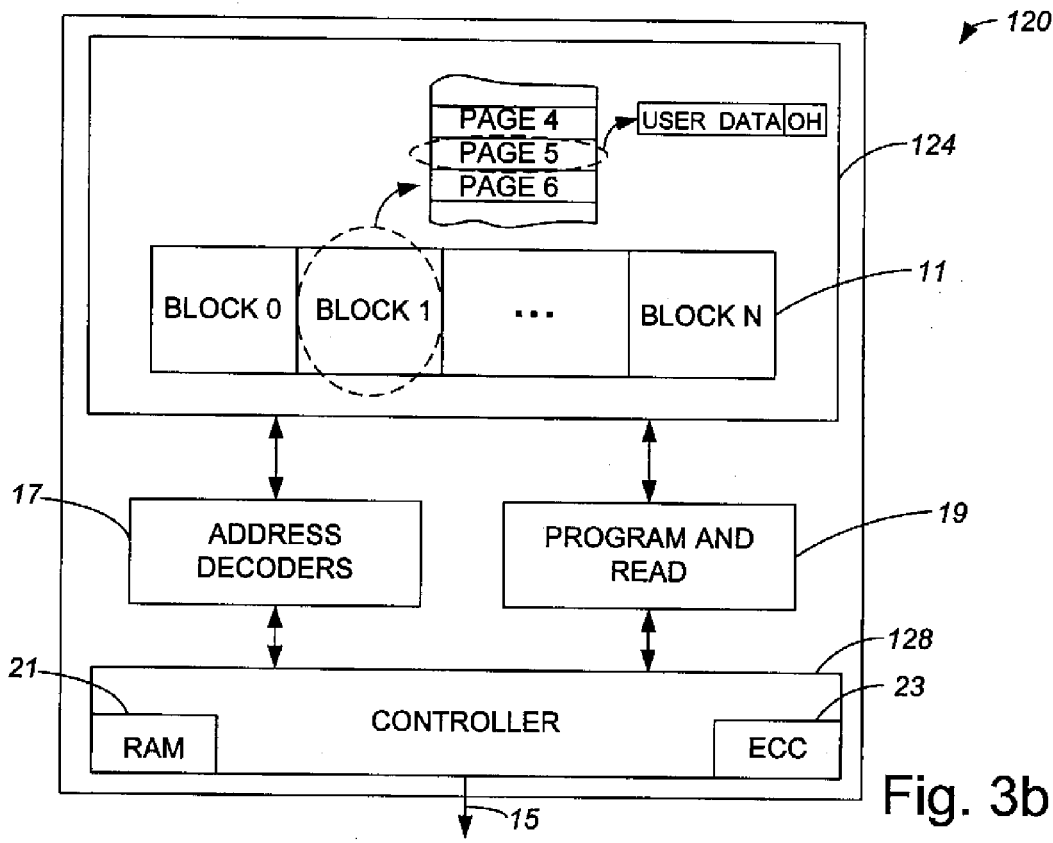

With reference to FIG. 3b, non-volatile memory device 120 will be described in more detail in accordance with an embodiment of the present invention. As described above, non-volatile memory device 120 includes non-volatile memory 124 and may include memory control system 128. In one embodiment, memory 124 and control system 128, or controller, may be primary components of non-volatile memory device 120, although when memory 124 is an embedded NAND device, for example, nonvolatile memory device 120 may not include control system 128. Memory 124 may be an array of memory cells formed on a semiconductor substrate, wherein one or more bits of data are stored in the individual memory cells by storing one of two or more levels of charge on individual storage elements of the memory cells. A non-volatile flash electrically erasable programmable read only memory (EEPROM) is one example of a common type of memory for such systems.

When present within non-volatile memory device 120, control system 128 communicates over a bus 15 to a host computer or other system that is using the memory system to store data. Bus 15 is generally a part of bus 104 of FIG. 3a. Control system 128 also controls operation of memory 124, which may include a memory cell array 11, to write data provided by the host, read data requested by the host, and perform various housekeeping functions in operating memory 124. Control system 128 generally includes a general purpose microprocessor which has associated non-volatile software memory, various logic circuits, and the like. One or more state machines may be included for controlling the performance of specific routines.

Memory cell array 11 may, in one embodiment, be addressed by control system 128 or microprocessor 108 through address decoders 17. In such an embodiment, decoders 17 apply the correct voltages to gate and bit lines of array 11 in order to program data to, read data from, or erase a group of memory cells being addressed by the control system 128. Additional circuits 19 may include programming drivers that control voltages applied to elements of the array that depend upon the data being programmed into an addressed group of cells. Circuits 19 may also include sense amplifiers and other circuits necessary to read data from an addressed group of memory cells. Data to be programmed into array 11, or data recently read from array 11, may be stored in a buffer memory 21 that is associated with control system 128, although data may instead be stored in other buffer memories (not shown). Control system 128 may also contain various registers for temporarily storing command and status data, and the like.

Array 11 is often divided into a large number of BLOCKS 0–N memory cells. As is common for flash EEPROM systems, the block may be the smallest unit of erase. That is, each block may be arranged to contain the minimum number of memory cells that are to be erased together. Each block is typically divided into a number of pages. As will be appreciated by those skilled in the art, a page may be considered to be the smallest unit of programming. That is, a basic programming operation may write data into or read data from a minimum of one page of memory cells. One or more sectors of data may be stored within each page. As shown in FIG. 3b, one sector includes user data and overhead data. Overhead data typically includes an error correction code (ECC) that has been calculated from the user data of the sector. A portion 23 of the control system 15 calculates the ECC when data is being programmed into array 11, and also checks the ECC when data is being read from array 11. Alternatively, the ECCs are stored in different pages, or different blocks, than the user data to which they pertain.

A sector of user data is typically 512 bytes, corresponding to the size of a sector in magnetic disk drives. Overhead data is typically an additional 16 bytes, although it should be appreciated that overhead data may generally include any number of bytes. One sector of data is most commonly included in each page, but two or more sectors may instead form a page. Any number of pages may generally form a block. By way of example, a block may be formed from eight pages up to 512, 1024 or more pages. The number of blocks is often chosen to provide a desired data storage capacity for the memory system. Array 11 is typically divided into a few sub-arrays (not shown), each of which contains a proportion of the blocks, which operate somewhat independently of each other in order to increase the degree of parallelism in the execution of various memory operations. An example of the use of multiple sub-arrays is described in U.S. Pat. No. 5,890,192, which is incorporated herein by reference in its entirety.

Figure 3C:
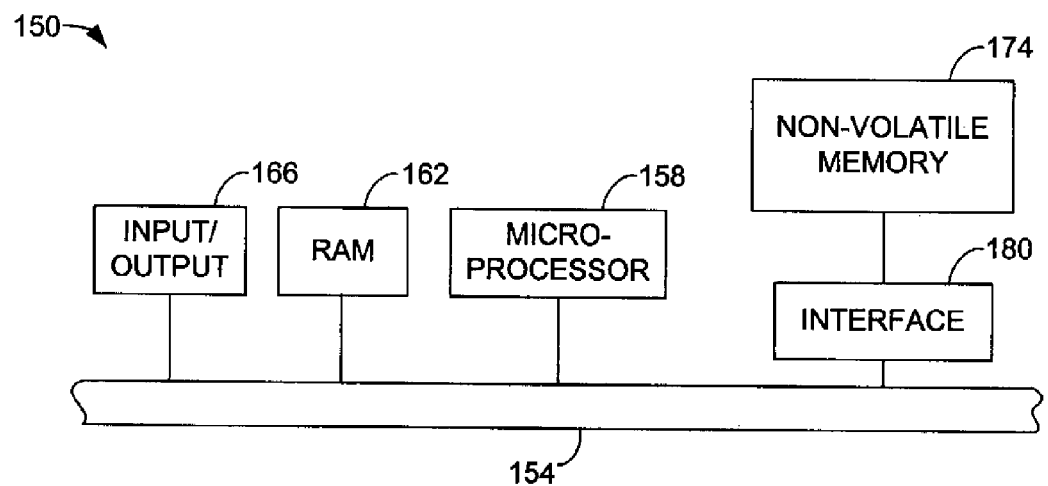
FIG. 3c is a diagrammatic representation of a host system which includes an embedded non-volatile memory.

In one embodiment, non-volatile memory is embedded into a system, e.g., a host system. FIG. 3c is a diagrammatic representation of a host system which includes an embedded non-volatile memory. A host or computer system 150 generally includes a system bus 154 which allows a microprocessor 158, a RAM 162, and input/output circuits 166, among other components (not shown) of host system 150, to communicate. A non-volatile memory 174, e.g., a flash memory, allows information to be stored within host system 150. An interface 180 may be provided between non-volatile memory 174 and bus 154 to enable information to be read from and written to non-volatile memory 174.

Non-volatile memory 174 may be managed by microprocessor 158 which effectively executes either or both software and firmware which is arranged to control non-volatile memory 174. That is, microprocessor 158 may run code devices (not shown), i.e., software code devices or firmware code devices, which allow non-volatile memory 174 to be controlled. Such code devices, which may be a flash memory packaged with CPU inside microprocessor 158, a separate flash ROM, or inside nonvolatile memory 174, which will be described below, may enable physical blocks in nonvolatile memory 174 to be addressed, and may enable information to be stored into, read from, and erased from the physical blocks.

Figure 4A:
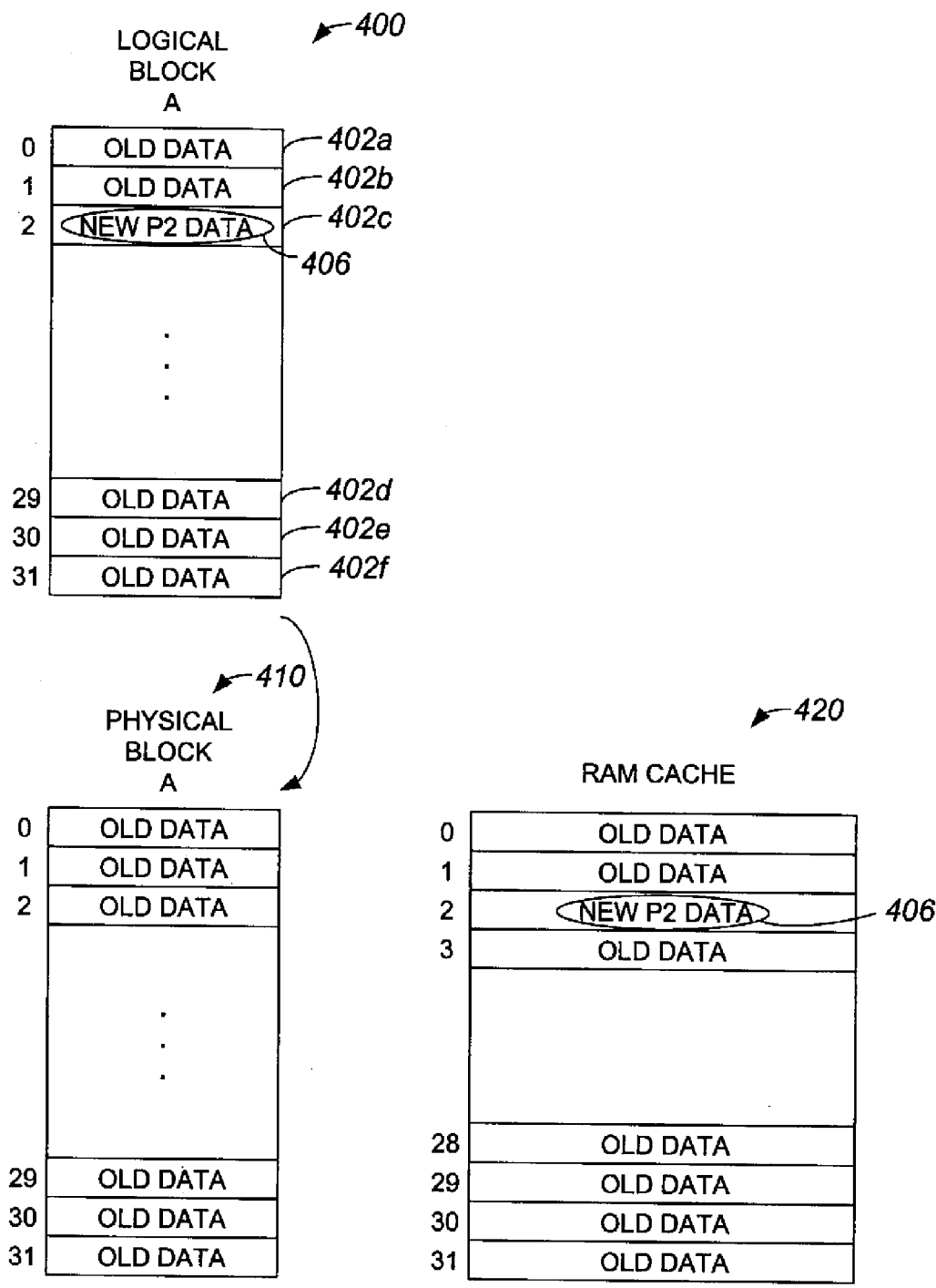
FIG. 4a is a diagrammatic representation of a logical block, a physical block, and a RAM cache that is arranged to cache updates associated with the logical block in accordance with an embodiment of the present invention.

When new or updated data associated with a logical block is received, that data may be cached in a RAM cache temporarily, e.g., until substantially updates associated with the logical block have completed and updates associated with a different logical block are to be processed. FIG. 4a is a diagrammatic representation of a logical block, a physical block, and a RAM cache that is arranged to cache updates associated with the logical block in accordance with an embodiment of the present invention. A physical block 'A' 410 that is located in a non-volatile memory component, e.g., a NAND flash memory component, is mapped to logical block 'A' 400. In the described embodiment, physical block 'A' 410 is substantially full and, hence, may not accept updated or new contents associated with logical block 'A' 400. As such, when contents of a logical page 402c of logical block 'A' 400 are updated, updated contents 406 may not be stored into physical block 'A' 410. Instead, updated contents 406 are temporarily stored or otherwise written, i.e., cached, into a RAM cache 420 after the current contents of physical block 'A' 410 are copied or cached into RAM cache 420.

It should be appreciated that writing updated contents 406 into RAM cache 420 may include overwriting older contents contained in RAM cache 420. For example, updated contents 406 may overwrite old data contents which were previously stored in RAM cache 420. While RAM cache 420 may be located substantially anywhere within an overall memory system, in one embodiment, RAM cache 420 may be associated with a controller which effectively controls a non-volatile memory component and, hence, physical block 'A' 410.

Figure 4B:
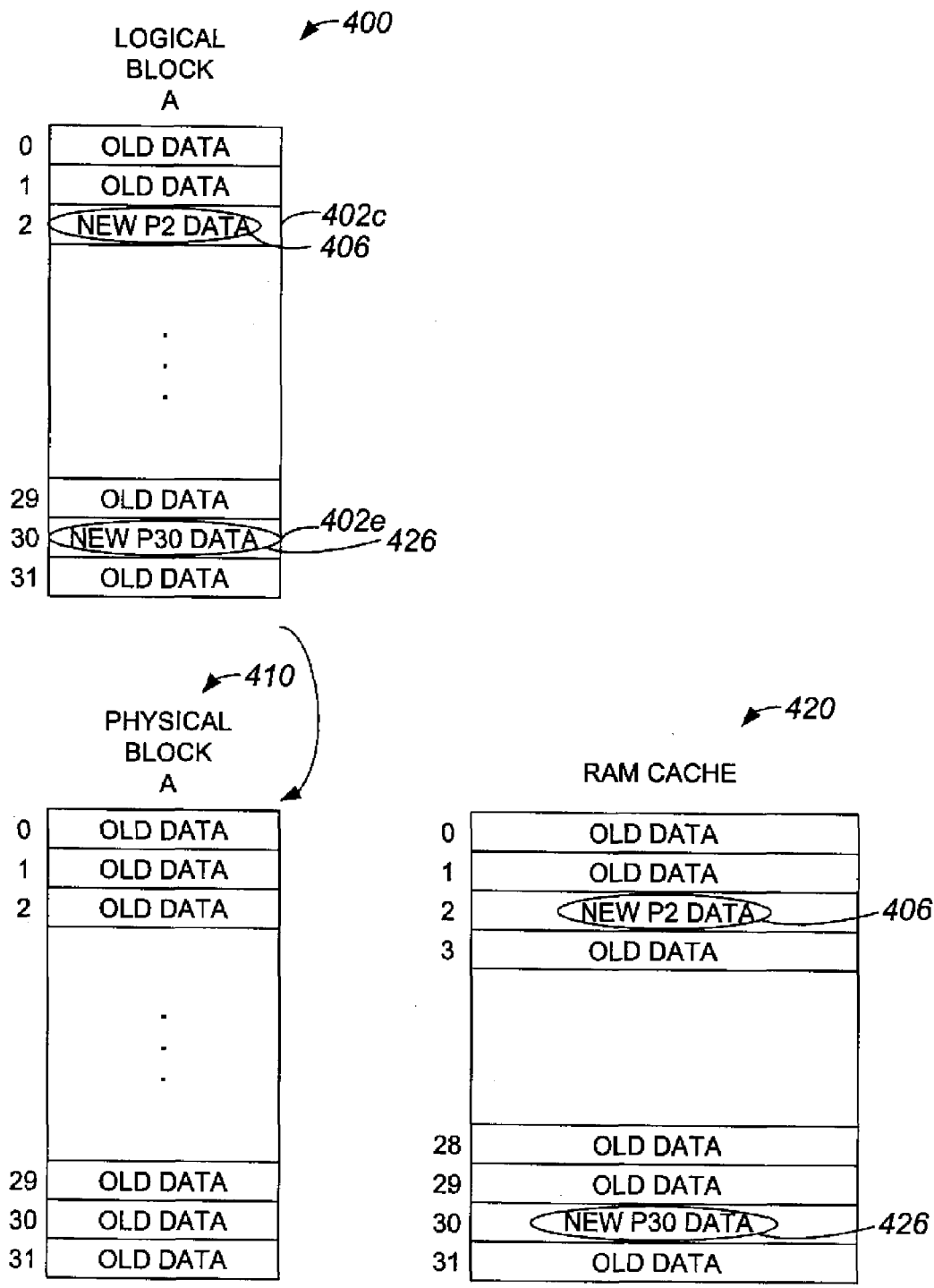
FIG. 4b is a diagrammatic representation of a logical block, a physical block, and a RAM cache, i.e., logical block 400, physical block 410, and RAM cache 420 of FIG. 4a, in which the RAM cache has cached a plurality of updates associated with the logical block in accordance with an embodiment of the present invention.

When a subsequent update is made to logical block 'A' 400 substantially before any other logical block (not shown)

is to be updated, then the subsequent update may also be stored into RAM cache 420. As shown in FIG. 4*b*, when there are updated contents 426 associated with page 402*e* of logical block 'A' 400, updated contents 426 may be cached into RAM cache 420 in substantially any suitable location within RAM cache 420. Updates may be substantially continuously stored into RAM cache 420 until a current set of updates associated with logical block 'A' 400 is completed. A current set of updates to logical block 'A' 400, in one embodiment, may be substantially all updates to logical block 'A' 400 which are processed before an update associated with a different logical block (not shown) are processed.

Figure 4C:
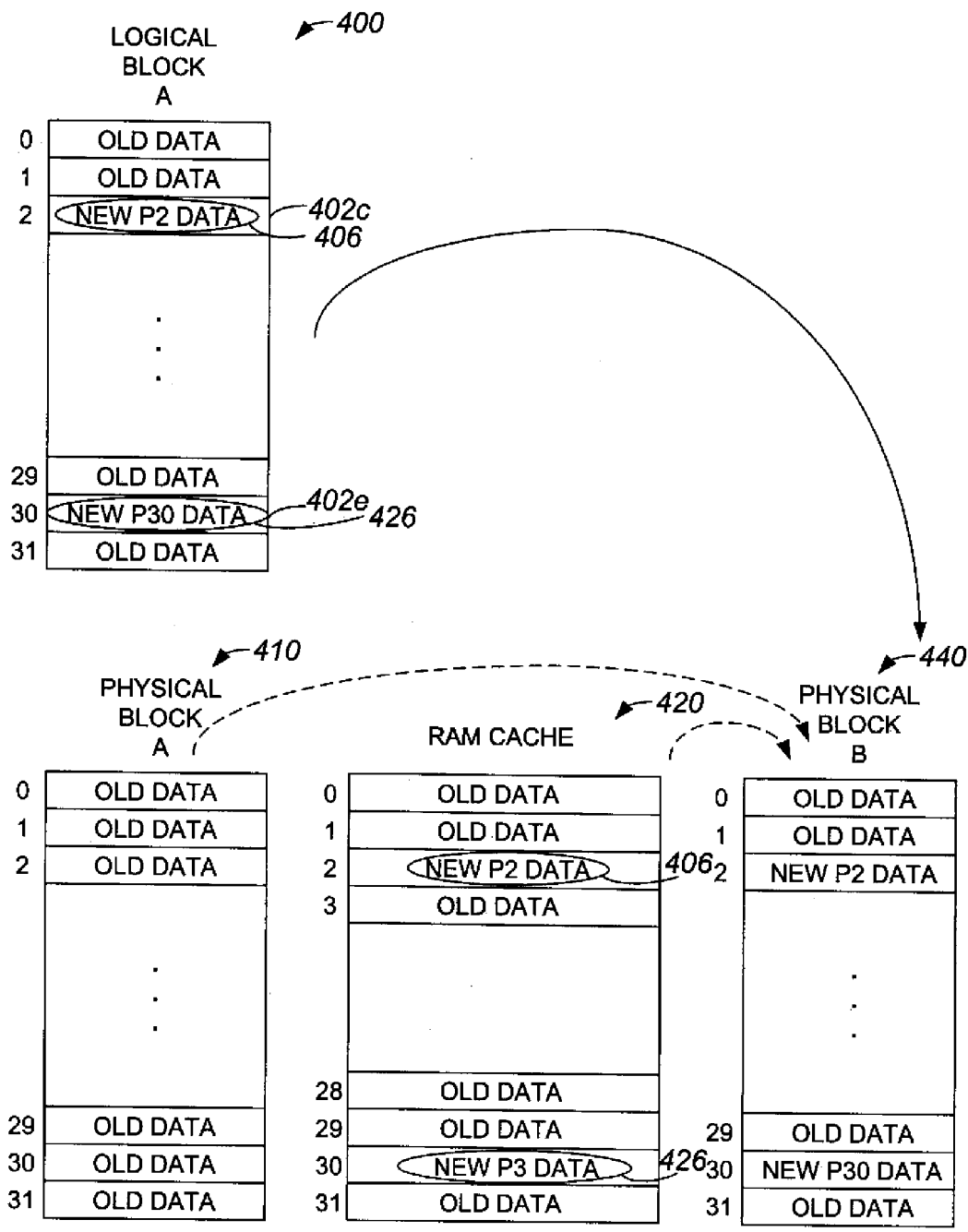
FIG. 4c is a diagrammatic representation of a physical block and a RAM cache, i.e., physical block 410 and RAM cache 420 of FIG. 4b, with contents which are to be written into a new physical block in accordance with an embodiment of the present invention.

When a current set of updates to logical block 'A' 400 have all been cached in RAM cache 420, then the updates which have been temporarily stored in RAM cache 420, e.g., updated contents 406, 426, may be written or otherwise copied into a new physical block. FIG. 4*c* is a diagrammatic representation of a physical block and a RAM cache, i.e., physical block 410 and RAM cache 420 of FIG. 4*b*, with contents which are to be written into a new physical block in accordance with an embodiment of the present invention. Once substantially all current updates are stored into RAM cache 420, a new physical block 'B' 440 may be obtained and mapped to logical block 'A' 400.

In general, the most recent or up-to-date contents associated with logical block 'A' 400 are to be written into physical block 'B' 440. The most recent contents associated with logical block 'A' 400 are substantially all contained within RAM cache 420. Hence, copying the contents of RAM cache 420 into physical block 'B' 440 enables physical block 'B' 440 to essentially be a version of logical block 'A' 400 in a physical block domain. When physical block 'B' 440 contains substantially all current information associated with logical block 'A' 400, physical block 'A' 410 may be erased, and disassociated or unmapped from logical block 'A' 400. As a result, logical block 'A' 400 typically is mapped to only single physical block at any given time. Hence, the use of physical blocks within a system is effectively economized, as substantially at the same time that physical block 'B' 440 is associated with logical block 'A' 400, physical block 'A' 410 is disassociated with logical block 'A' 400, and may be returned to a spare block pool.

Figure 5:
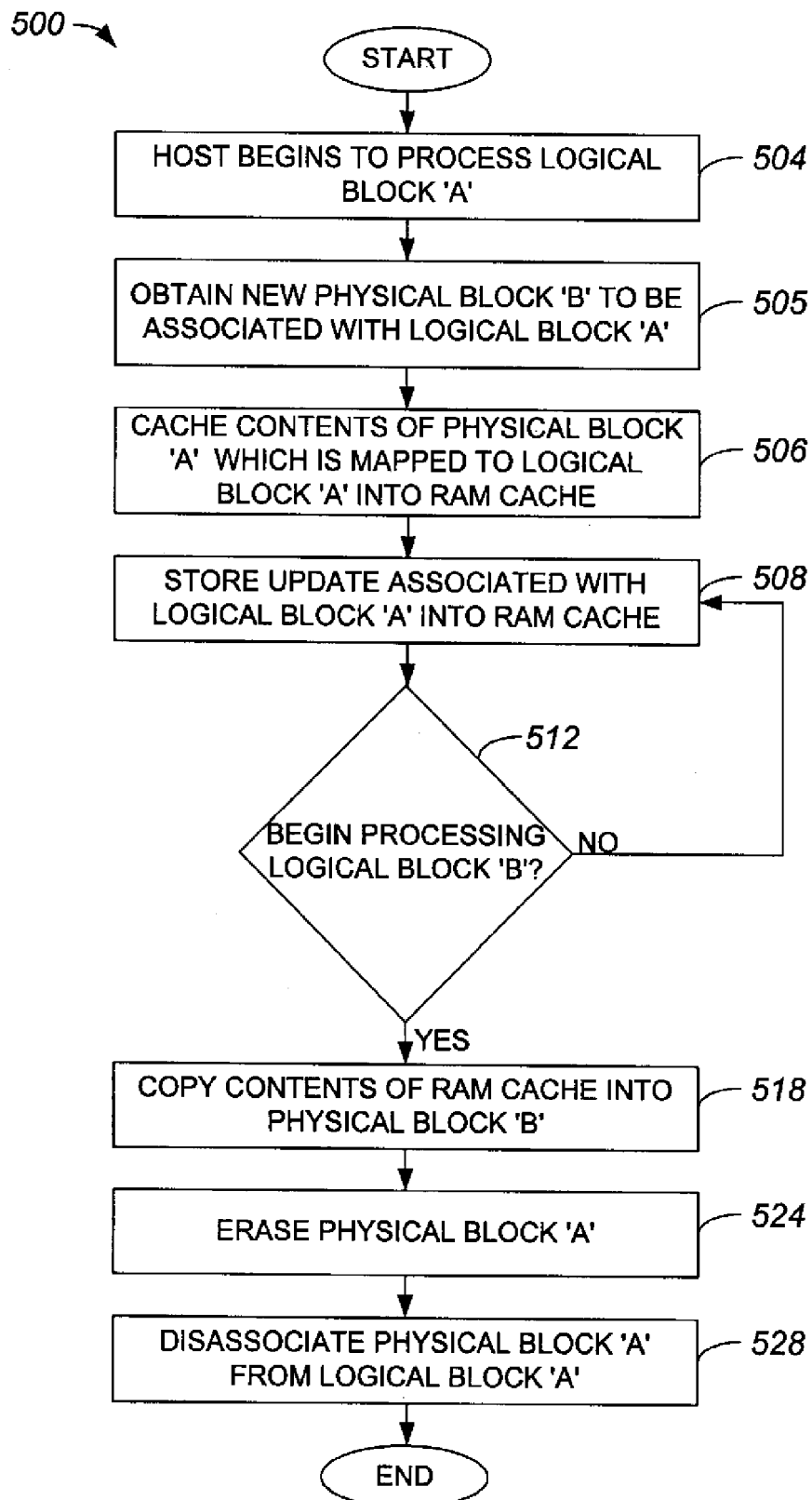
FIG. 5 is a process flow diagram which illustrates the steps associated with one method of updating contents of a page in a physical block domain through the use of a RAM cache in accordance with an embodiment of the present invention.

Referring next to FIG. 5, the steps associated with one method of updating contents of a page in a physical block domain through the use of a RAM cache will be described in accordance with an embodiment of the present invention. A process 500 of using a RAM cache to temporarily store page updates begins at step 504 in which a host begins to process a logical block 'A.' The host, e.g., the system with which a non-volatile memory is interfacing or the system in which a non-volatile memory is embedded, may begin to process logical block 'A' when the host processes an update associated with a page contained within logical block 'A.'

When there is substantially no available space available in a physical block 'A' that is associated with logical block 'A,' physical block 'A' is effectively unable to accommodate updates. Hence, a RAM cache may be used to cache updates before the updates are stored into a new physical block. From step 504, process flow proceeds to step 505 in which a new physical block 'B' is obtained. New physical block 'B' is obtained, e.g., from a set of spare blocks, to be mapped to or otherwise associated with logical block 'A.' Substantially all contents of physical block 'A' may be cached or written into a RAM cache in step 506. In step 508, an update to a page contained in logical block 'A' is stored into the RAM cache, e.g., by a controller. Generally, an update may include either updated data or new data, and the update may cause data associated with physical block 'A' to be overwritten in the RAM cache. As described above with respect to FIGS. 4*a*–*c*, the RAM cache is RAM or similar memory which is available for use in temporarily storing updated data. Once the update to the logical page is stored into the RAM cache, a determination is made in step 512 regarding whether the host is ready to begin processing a different logical block, e.g., logical block 'B.' In other words, it is determined if there are any more updates associated with logical block 'A' that need to be stored into the RAM cache before another block is processed.

If the determination in step 512 is that it is not time to begin processing logical block 'B,' then the indication is that there are more updates associated with logical block 'A.' Accordingly, process flow returns to step 508 in which an update associated with logical block 'A' is stored into the RAM cache. Alternatively, if it is determined that it is effectively not time to being processing a different logical block, the contents of the RAM cache are written into physical block 'B' in step 518 such that the most recent contents associated with logical block 'A' are stored or written in physical block 'B.'

Once information is stored into physical block 'B,' physical block 'A' is erased in step 524. It should be appreciated that it is typically not necessary to erase the RAM cache after the contents of the RAM cache are merged into physical block 'B', as information stored in the RAM cache may be overwritten. Typically, when the contents of another physical block are stored into the RAM cache, the previous contents of the RAM cache are overwritten. In one embodiment, however, the RAM cache may be erased once the contents of the RAM cache are merged into physical block 'B.'

After physical block 'A' is erased in step 524, physical block 'A' is disassociated from logical block 'A' in step 528. Disassociating physical block 'A' from logical block 'A' may include updating mappings to indicate that logical block 'A' is associated with physical block 'B.' Upon disassociating physical block 'A' from logical block 'A,' the process of using a RAM cache to temporarily store page updates associated with a logical block is completed.

Although the use of a RAM cache to temporarily store updates associated with a logical block prior to writing the updates into a physical block is effective, a memory system may not always have RAM available for use as a RAM cache. Typically, a RAM cache is of a size that may accommodate substantially all contents of a block. As such, the size of a RAM cache may vary depending upon the size of physical blocks within a system. For example, if a physical block within a system generally includes approximately 32 pages, then the RAM cache may be of a size that is at least large enough to accommodate the contents of approximately 32 pages of a block. In the event that software requirements are such that a RAM cache of a suitable size to accommodate a physical block is unavailable, then an actual physical block may instead be used to temporarily hold information before the information is written into a physical block that is associated with a logical block. In other words, rather than implementing a "caching block" which is a RAM cache, a caching block which is a physical block may instead be implemented.

Figure 6A:
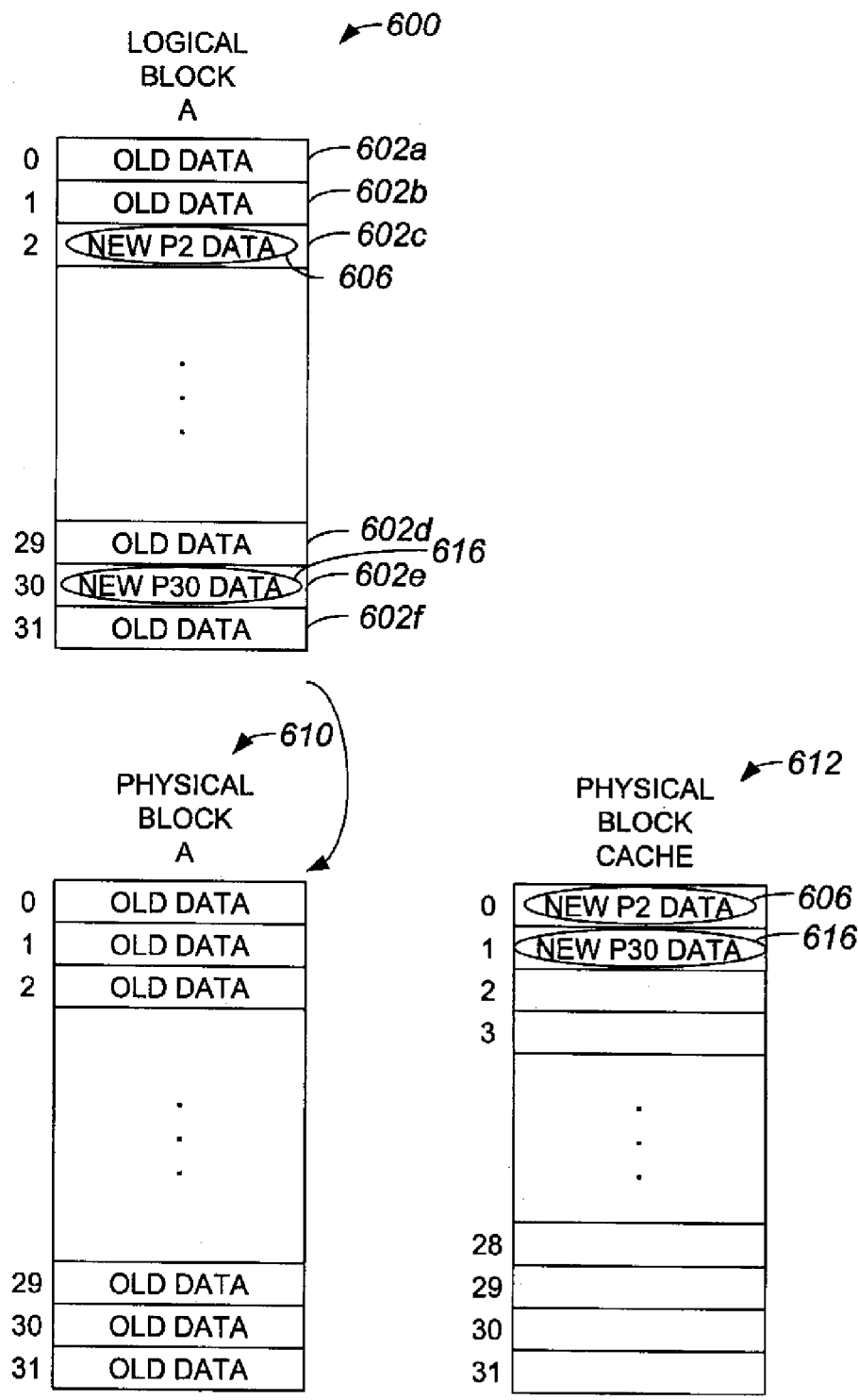
FIG. 6a is a diagrammatic representation of a logical block, a physical block, and a physical block cache that is arranged to cache updates associated with the logical block in accordance with an embodiment of the present invention.

FIG. 6*a* is a diagrammatic representation of a logical block, a physical block, and a caching block, e.g., a physical block cache, that is arranged to cache updates associated with the logical block in accordance with an embodiment of the present invention. A physical block 'A' 610 of a nonvolatile memory component is mapped to logical block 'A' 600. When physical block 'A' 610 is substantially full and is in effect unable to accommodate updated or new contents associated with logical block 'A' 600, a physical block cache 612 may be used to temporarily cache the updated or new contents.

As shown, logical page 602c of logical block 600 includes updated contents 606. Updated contents 606 may be stored substantially anywhere within physical block cache 612, provided that an indication that updated contents 606 are associated with logical page 602c is either stored in physical block cache 612 or available such that updated contents 606 may be identified as being associated with logical page 602c. By way of example, updated contents 606 may be cached into the first available page within physical block cache 612, as shown. Alternatively, in one embodiment, updated contents 606 may be written or cached into physical block cache 612 in a location which corresponds to logical page 602c.

When there is a subsequent update that is effectively made, e.g., when updated contents 616 are associated with logical page 602e, then updated contents 616 may also be cached into physical block cache 612. Once substantially all updates associated with logical block 'A' 600 are at least temporarily completed, e.g., when it is time to process a different logical block (not shown), then the most recent data associated with logical block 'A' 600, which includes updates 606, 616, may be written into a new physical block, as will be described with respect to FIG. 6b. In some embodiments, the "most recent data" associated with logical block 'A' 600 may only include updates, while in other embodiments, including the embodiment as shown, the most recent data associated with logical block 'A' 600 may include updates 606, 616 and some contents of physical block 'A' 610 which have not been usurped by updates 606, 616. It should be appreciated that when physical block cache 612 is full, even when it is not time to process a different logical block (not shown), a merge operation or similar operation may occur to provide the most recent contents associated with logical block 'A' 600 into a new physical block. The new physical block may then become an "old" physical block, and further updates associated with logical block 'A' 600 may be cached into a new physical block cache 612.

Figure 6B:
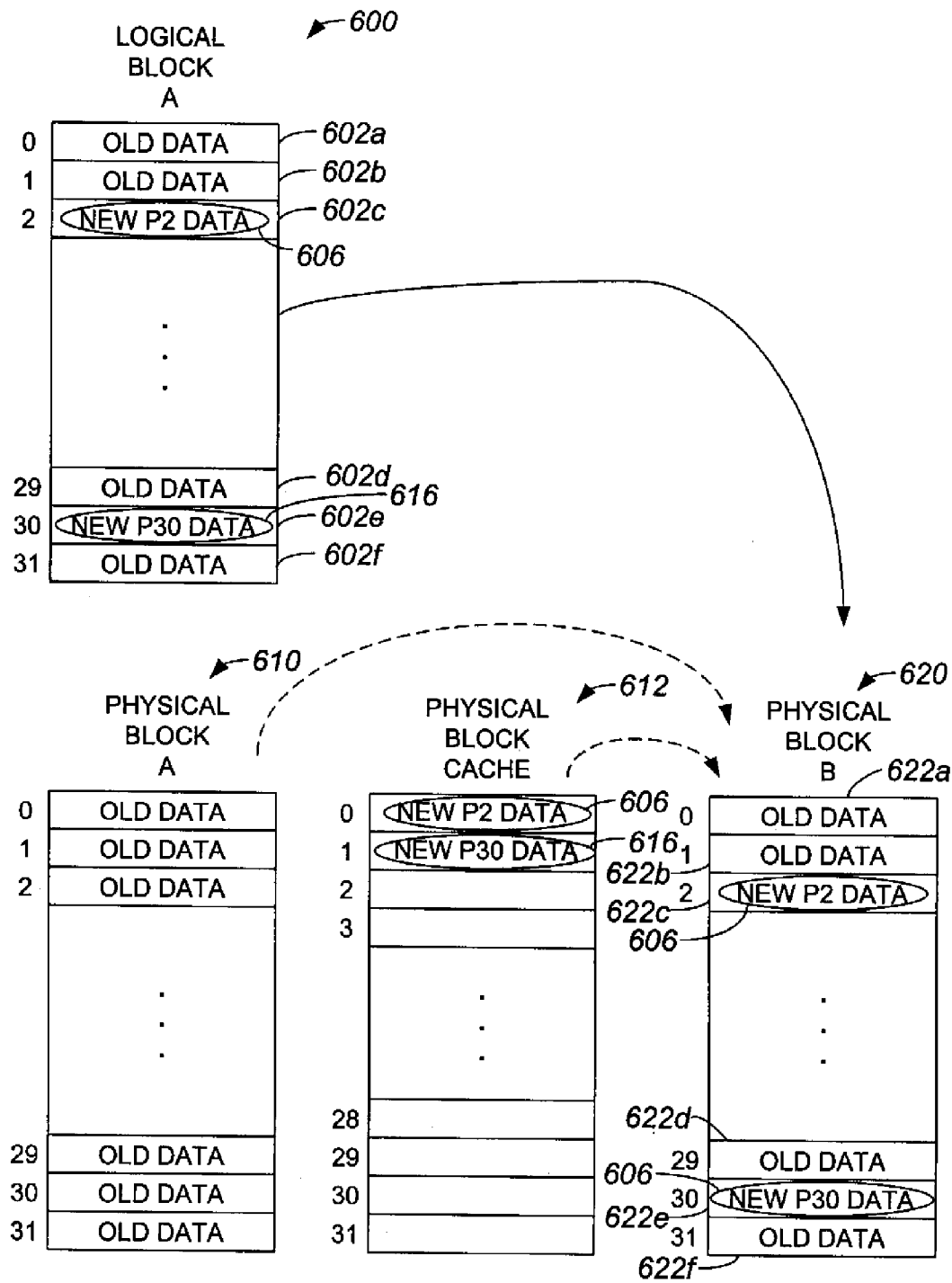
FIG. 6b is a diagrammatic representation of a physical block and a physical block cache, i.e., physical block 610 and physical block cache 612 of FIG. 6a, with contents which are to be merged into a new physical block in accordance with an embodiment of the present invention.

Assuming that a different logical block is to be processed, as shown in FIG. 6b, a new physical block 'B' 620 that is mapped to logical block 'A' 600 may be obtained. It should be understood that new physical block 'B' 620 may be obtained either on an as needed basis or, in one embodiment, may be obtained when a caching process associated with logical block 'A' 600 first begins. In general, the most recent or up-to-date contents associated with logical block 'A' 600 are to be written into physical block 'B' 620. Often, the most recent contents associated with logical block 'A' 600 may be contained within both physical block 'A' 610 and physical block cache 612. Specifically, substantially any updated contents of logical block 'A' 600 are contained in physical block cache 612, while older contents or contents which have not been updated as a result of a current set of updates are contained in physical block 'A' 610. It should be appreciated that some updated contents of logical block 'A' 600 may be usurped by more recently updated contents which are also contained within logical block 'A' 600, e.g., newer updated contents (not shown) may effectively usurp updated contents 606.

The contents of physical block 'A' 610 and physical block cache 612 are effectively combined such that pages of physical block 'B' 620 contain updated contents 606, 616 obtained from physical block cache 612 and contents of physical block 'A' 610 that are current, i.e., contents of physical block 'A' 610 which have not effectively been usurped by contents of physical block cache 612. In some cases, substantially all contents of physical block 'A' 610 may be usurped by contents of physical block cache 612 such that no contents of physical block are included in physical block 'B' 620. Once physical block 'B' 620 is essentially a version of logical block 'A' 600 in a physical block domain and, hence, contains substantially all current information associated with logical block 'A' 600, physical block 'A' 610 may be erased.

FIG. 7 is a process flow diagram which illustrates the steps associated with one method of updating contents of a page in a physical block domain through the use of a physical block cache in accordance with an embodiment of the present invention. A process 660 of using a block cache to temporarily store logical page updates begins at step 670 in which a host begins to process a logical block 'A.' In other words, the system with which a non-volatile memory is interfacing or the system in which a non-volatile memory is embedded, may begin to process updates to contents of logical block 'A.'

After the host begins to process logical block 'A,' a new physical block 'B' that is to be mapped to logical block 'A' is obtained in step 672. Then, an update to a page contained in logical block 'A' is stored into a block cache in step 674, as for example by a controller. As discussed above with respect to FIGS. 6a and 6b, when a physical block 'A' that is mapped to logical block 'A' may not accommodate a page update, the page update may be stored into a cache. Once the update to a page in logical block 'A' is stored into the block cache, a determination is made in step 678 as to whether the host is ready to begin processing a different logical block, e.g., logical block 'B.' That is, it is determined if there are any more updates associated with logical block 'A' that need to be processed.

If the determination in step 678 is that it is not time to begin processing logical block 'B,' then the indication is that there are more updates associated with logical block 'A.' Accordingly, process flow returns to step 674 in which an update associated with logical block 'A' is stored into the block cache. On the other hand, if it is determined that it is not time to begin processing logical block 'B,' then the contents of physical block 'A' and the block cache may be combined into physical block 'B' in step 686 such that the most recent contents associated with logical block 'A' are written into physical block 'B.' That is, the contents of physical block 'A' and the contents of the block cache are effectively merged and stored into physical block 'B' such that physical block 'B' contains the current contents associated with the pages of logical block 'A.' It should be appreciated that in some cases, contents of the block cache may effectively usurp contents of physical block 'A' such that substantially no contents of physical block 'A' are copied or stored into physical block 'B.'

Physical block 'A' is erased in step 690, after the current contents associated with logical block 'A' are written into physical block 'B.' Then, in step 694, the block cache is erased. Once the block cache is erased, physical block 'A' is disassociated from logical block 'A' in step 698. It should be appreciated that disassociating physical block 'A' from logical block 'A' may include updating mappings to indicate that logical block 'A' is associated with physical block 'B.' After physical block 'A' is disassociated from logical block 'A,' the process of using a block cache to temporarily store page updates associated with a logical block is completed.

In general, the functionality associated with enabling a RAM cache or a block cache to be utilized is provided in software, e.g., as program code devices, or as firmware in a host system. One embodiment of a suitable system architecture associated with the software or firmware provided to a host system in accordance with an embodiment of the present invention is shown in FIG. 8. A system architecture 700 generally includes a variety of modules which may include, but are not limited to, an application interface module 704, a system manager module 708, a data manager module 712, a data integrity manager 716, and a device manager and interface module 720. In general, system architecture 700 may be implemented using software code devices or firmware which may be accessed by a processor, e.g., processor 108 of FIG. 3a.

In general, application interface module 704 may be arranged to communicate with the host, operating system or the user directly. Application interface module 704 is also in communication with system manager module 708 and data manager module 712. When the user wants to read, write or format a flash memory, the user sends requests to the operating system, the requests are passed to the application interface module 704. Application interface module 704 directs the requests to system manager module 708 or data manager module 712 depending on the requests.

System manager module 708 includes a system initialization submodule 724, an erase count block management submodule 726, and a power management block submodule 730. System initialization submodule 724 is generally arranged to enable an initialization request to be processed, and typically communicates with erase count block management submodule 726.

In addition to being in communication with application interface module 704, system manager module 708 is also in communication with data manager module 712, as well as device manager and interface module 720. Data manager module 712, which communicates with both system manager module 708 and application interface module 704, may include functionality to provide page or block mapping. Data manager module 712 may also include functionality associated with operating system and file system interface layers.

Device manager and interface module 720, which is in communication with system manager module 708, data manager 712, and data integrity manager 716, typically provides a flash memory interface, and includes functionality associated with hardware abstractions, e.g., an I/O interface. Data integrity manager module 716 provides ECC handling, among other functions.

In one embodiment of the present invention, rather than performing block caching such that caching occurs substantially on a page by page basis, block caching may be performed in terms of groups. Groups, as described in co-pending U.S. patent application Ser. No. 10/281,855, include any number of pages within a block. For example, a block which includes 32 pages may be arranged such that the 32 pages are grouped into four groups of eight pages each. In general, the number of groups in a block and the number of pages in a group may vary widely.

When a grouping scheme is used, updated data may be written into a physical block as a part of a group. FIG. 9a is a diagrammatic representation of a logical block, a physical block, and a new physical block which are divided into groups in accordance with an embodiment of the present invention. A logical block 'A' 900 is divided into logical groups 904 which, in turn, each include a number of logical pages 908. Although logical block 'A' 900 is shown as including four logical groups 904 which each include four pages 908, the number of groups 904 and pages 908 included in logical block 'A' 900 may vary widely. The group 904 to which a particular page 908 belongs is typically identified in an overhead or redundant area associated with each page 908.

A physical block 'B' 912 is associated with logical block 'A' 900 such that physical block 'B' 912 contains data or contents associated with logical block 'A' 900. As shown, a first physical group 916a, which includes physical pages (not shown), of physical block 'B' 912 contains data 920a associated with logical group 904a. Similarly, a second physical group 916b contains data 920b associated with logical group 904b, a third physical group 916c contains data 920c associated with logical group 904c, and a fourth physical group 916d contains data 920d associated with logical group 904d.

When an update 924 is received, e.g., from a host, that indicates that data associated with logical group 904b is to be updated, update 924 is effectively merged with data 920b, and stored into a first available group 932a in a new physical block 'B1' 928. Merging occurs to enable the most recent contents associated with each page of logical group 904b to be stored into group 932a. The merging of data associated with an updated group and original data will be described below with reference to FIG. 10. As shown in FIG. 9b, when an updating process associated with logical block 'A' 900 is completed, physical block 'B1' 928 may become the physical block associated with logical block 'A' 900, i.e., physical block 'B1' 928 may become associated with logical block 'A' 900 while physical block 'B' 912 is disassociated from logical block 'A' 900.

Before physical block 'B' 912 is disassociated from logical block 'A' 900, the contents of physical block 'B' 912 which have not been merged into physical block 'B1' 928. For example, data 920b that is associated with first logical group 904a is copied or otherwise provided to a second physical group 932b of physical block 'B1' 928, while data 920c associated with third logical group 904c is provided to third physical group 932c. Similarly, data 920d associated with fourth logical group 904d may be provided to fourth physical group 932d. As a result, the most recent contents associated with logical block 'A' 900 are present in physical block 'B1' 928.

After physical block 'B1' 928 becomes the physical block associated with logical block 'A' 900, additional updates may be made to logical block 'A' 900. With reference to FIG. 9c, a process of processing additional updates to logical block 'A' 900 which has previously been updated and is divided into groups 904 will be described in accordance with an embodiment of the present invention. When a new update 940 associated with logical group 904b is to be processed, since physical block 'B' 912 no longer includes the most recent contents associated with logical block and physical block 'B1' 928 is effectively full, a new physical block 'B2' 944 may be obtained to store updated 940. Specifically, data 936, which is associated with logical group 904b, that is stored in physical group 932a is merged with update 940, and stored into a first available group 946a of physical block 'B2' 944 as updated data 948. Updated data 948 includes the most recent contents associated with pages within logical group 904b.

Once an updating process is completed, the most recent data associated with logical block 'A' 900 may be provided to physical block 'B2' 944. By way of example, data 920a associated with first logical group 904a may be provided to second physical group 946b of physical block 'B2' 944, data 920c associated with third logical group 904c may be provided to third physical group 946c, and data 920d associated with fourth logical group 904d may be provided to fourth physical group 946d. When physical block 'B2' 944 contains the most recent contents associated with logical block 'A' 900, then physical block 'B2' 944 may be associated with logical block 'A' 900 while physical block 'B1' 928 may be disassociated from logical block 'A' 900.

If a logical block that is divided into groups initially has no contents, then when new or updated data associated with the logical block is received, as for example from a host, the new or updated data may be stored into a physical block even if some of the data effectively usurps other data stored in the physical block. FIG. 9d is a diagrammatic representation of a logical block that is divided into groups, a physical block that includes updated data associated with the logical block, and a new physical block which contains the most recent data associated with the logical block in accordance with an embodiment of the present invention. When a logical block 'A' 950 initially includes no contents, when contents are to be associated with logical block 'A' 950, the contents may be written into a physical block 'B' 956 that is associated with logical block 'A' 950. As shown, when new data 960a associated with a second logical group 952b of logical block 'A' 950 is provided, data 960a may be stored into a first available physical group 958a of physical block 'B' 956.

When data associated with second logical group 952b is updated, updated data 960a' may be stored into a next available physical group 958, e.g., second physical group 958b. After data 960a' is stored, if new data 960b which is associated with third logical group 952c is received, data 960b is stored into a next available physical group 958, namely third physical group 958c. Finally, if updated data 960a" associated with second logical group 952b is received, updated data 960a" is stored into fourth physical group 958d, which, in the described embodiment, is the last physical group 958 available in physical block 'B' 956.

Once physical block 'B' 956 is full, i.e., once all groups within physical block 'B' 956 contain data 960, and new or updated data associated with logical block 'A' 950 is received, a new physical block is generally obtained for use. By way of example, if new data 966 for logical group 952d is received, a new physical block 'B1' 962 may be obtained to accommodate data 966. Data 966 may be stored into a first available group 964a in physical block 'B1' 962. After data 966 is stored, data 960 included in physical block 'B' 956 may be stored into physical block 'B2' 962.

In order to store data 960 included in physical block 'B' 956 into physical block 'B2' 962, groups 958 may be read from physical block 'B' 956 in a "bottom first" manner, i.e., starting with group 958d and ending with group 958a. If data exists at the same page offset within physical groups 958a, 958b, 958d which contain data 960 associated with logical group 952b, then the data contained at the page offset in physical group 958d is judged to be the most recent data. In general, the higher the physical group number, the newer the data of the same group. Once the most recent data associated with logical group 952b is identified or, more generally, once data 960a, data 960a', and data 960a" are appropriately merged, merged, updated data 968 associated with logical group 952b is stored into group 964b within physical block 'B1' 962. Since substantially only one group 958c within physical block 'B' 956 includes data 960b associated with logical group 952d, data 960b may be provided into third group 964c of physical block 'B1' 962. As no data is stored in group 964d, group 964d is effectively available to accommodate data associated with a new logical group, e.g., logical group 952a.

As previously mentioned, when updated data for a logical group is received, if older data exists for that group, the older data may be merged with updated data if appropriate. In one embodiment, when the updated data includes updated data for substantially every page within the group, then the updated data effectively overwrites all the older data. However, when the updated data includes updates to only some pages within the group, then a merging process may occur. Referring next to FIG. 10, one method of merging original data of a group with new data of a group will be described in accordance with an embodiment of the present invention. A group 'X' 1000 may include eight pages 1002. Some pages 1002 may include data, while other pages 1002 may be substantially empty. As shown, pages 1002a, 1002d, 1002e include original data.

When new data for group 'X' 1000 is received in the form of an update from a host, for example, the new data may be provided in pages 1008 of a group update 1006. Pages 1008a–d, and page 1008g include new or updated data which is to be merged with data included in group 'X' 1000. A merge process typically includes identifying the most recent data associated with group 'X' 1000. Since new data effectively overwrites original data, the new data is considered to be the most recent data associated with group 'X' 1000. On the other hand, when there is no new data that effectively overwrites original data, then the original data may be considered to be the most recent data.

Merged data 1010, which contains the results of merging original data for group 'X' 1000 with new data provided in group update 1006, includes pages 1012, is such that a first page 1012a, which corresponds to first page 1002 of group 'X' 1000 includes new data from page 1008a, since new data from page 1008a effectively usurps original data stored in first page 1002. Since no data was originally included in pages 1002b, 1002c, new data which was provided with pages 1008b, 1008c, is written into pages 1012b, 1012c, respectively. Page 1012d contains new data from page 1008d, as the data contained in page 1008d is more recent than the data contained in page 1002d. Page 1012e contains original data from page 1002e, as group update 1006 did not include updated contents in page 1008e. Finally, page 1012g contains new data contained in page 1008g. Once merged data 1010 is completed, merged data 1010 effectively becomes group 'X' 1000.

In general, when an update to a group includes data associated with a particular page, that data is included in the corresponding page within a resulting merged data for the group, since that data is either the only data associated with the particular page, or that data overwrites original data associated with the particular page. Alternatively, when the original data of a given page is not overwritten by an update to the group which includes the page, then the original data is included in the corresponding page within the resulting merged data for the group.

FIGS. 11a and 11b, are a process flow diagram which illustrates the steps associated with one method of updating the contents associated with a logical block that is divided into groups in accordance with an embodiment of the present invention. A process 1100 of updating contents begins at step 1102 in which contents associated with group 'X' of a logical block 'A', which is associated with a physical block 'B', are updated, e.g., by a host. Typically, a logical group 'X' includes two or more pages. Once the contents associated with group 'X' of logical block 'A' are updated, a new physical block "B1' is obtained to be associated with logical block 'A' in step 1104.

In step 1106, the old contents associated with logical group 'X', which are typically stored in a group within physical block 'B', are merged with the new or updated contents for logical group 'X,' and are stored into physical block 'B1'. After the merged contents are stored into physical block 'B1,' a determination is made in step 1108 as to whether there are more new or updated contents for logical block 'A' that are to be stored. If is is determined that there are additional new or updated contents to be stored, then process flow return to step 1105 in which old contents associated with logical group 'X', which may be a different logical group within logical block 'A', are merged with new or updated contents. In other words, new or updated contents may be associated with substantially any logical group within logical block 'A' and, hence, the merge will occur between the new or updated contents and an appropriate logical group.

Alternatively, if it is determined in step 1108 that there are no more new or updated contents for logical block 'A' to be stored, then a determination is made in step 1110 as to whether there is enough space in physical block 'B1' to store remaining contents, e.g., contents which have not been merged into physical block 'B1', of physical block 'B'. That is, it is determined if a full physical representation of the current contents associated with logical block 'A' may be stored into physical block 'B'. When it is determined that there are enough groups available in physical block 'B1' to store the remaining contents of physical block 'B' into physical block 'B1', then in step 1120, the remaining contents from physical block 'B' are copied into physical block 'B1'.

After the remaining contents from physical block 'B' are copied into physical block 'B1,' then physical block 'B1' effectively contains the most recent contents or the current contents associated with logical block 'A'. As such, physical block 'B' is erased in step 1122, and disassociated from logical block 'A' in step 1124. Once physical block 'B' is disassociated from logical block 'A', the process of updating contents associated with a logical block is completed.

Returning to step 1110, if it is determined that there are not enough groups available in physical block 'B1' to store the remaining contents of physical block 'B,' then the indication is that a new physical block is to be obtained to contain the most recent contents associated with logical block 'A'. Accordingly, process flow moves to step 1112 in which a new physical block 'B2' is allocated to be associated with logical block 'A'. Once new physical block 'B2' is obtained, the contents of physical block 'B' and physical block 'B1 are merged into physical block 'B2' in step 114 such that the most recent contents associated with logical block 'A' are stored in physical block 'B2'. In general, merging contents of physical block 'B' and physical block 'B1' includes merging contents of groups within physical block 'B' and physical block 'B1'.

After contents are merged into physical block 'B2,' physical block 'B1' is erased in step 1116. Once physical block 'B1' is erased, physical block 'B1' is disassociated from logical block 'A' in step 1118. Then, process flow proceeds to step 1122 in which physical block 'B' is erased.

A RAM cache, which was described above, may be use to cache group updates associated with logical groups. The use of a RAM cache may generally reduce the number of erase processes needed during the course of an update process associated with a logical block, as a RAM cache may be updated until the update process is completed, at which time a new physical block may be obtained to store the most recent data associated with the logical block, and the old physical block may be erased.

With reference to FIG. 12*a*, the use of a RAM cache which is effectively divided into groups will be described in accordance with an embodiment of the present invention. A logical block 'A' 1200 is divided into logical groups 1204 which, in turn, each include a number of logical pages 1208. A physical block 'B' 1212 is associated with logical block 'A' 1200 such that physical block 'B' 1212 contains data or contents associated with logical block 'A' 1200. As shown, a first physical group 1216*a*, which includes physical pages (not shown), of physical block 'B' 1212 contains data 1220*a* associated with logical group 1204*a*. Similarly, a second physical group 1216*b* contains data 1220*b* associated with logical group 1204*b*, a third physical group 1216*c* contains data 1220*c* associated with logical group 1204*c*, and a fourth physical group 1216*d* contains data 1220*d* associated with logical group 1204*d*.

When an update 1224 is received, as for example from a host, that indicates that data associated with logical group 1204*b* is to be updated, update 1224 is stored into a first available group 1232*a* within a RAM cache 1228. Alternatively, in one embodiment, since update 1224 is associated with second logical group 1204*b*, update 1124 may be stored into second RAM group 1232*b*.

If an additional update is received that indicates that data associated with logical group 1204*b* is once again to be updated, then such an update may be merged with the contents of group 1232*a* within RAM cache 1228. As shown in FIG. 12*b*, when a new update 1236 which corresponds to logical group 1204*b* is received, the data in new update 1236 may be merged with contents which were previously stored in RAM group 1232*a* to form merged, updated data 1224' which is associated with logical group 1204*b*. In some instances, some of new updated data 1236 may overwrite previous updated data, i.e., new data 1224 of FIG. 12*a*, during a merging process since RAM may be overwritten.

When an update 1240 for logical group 1204*d*, update 1240 may be stored into the next available RAM page 1232*b*. It should be appreciated that regardless of whether update 1240 is received before or after update 1236, update 1236 is still incorporated into group 1232*a*, and update 1240 is stored into group 1232*b*.

Once substantially all updates that are to be made to logical block 'A' 1200 are completed, i.e., when it is time for another logical block to be updated, contents of RAM cache 1228 and contents of physical block 'B' 1212 may be merged into a new physical block. FIG. 12*c* is a diagrammatic representation of logical block 'A' 1200 and a new physical block after contents of RAM cache 1228 and physical block 'B' 1212 have been merged into the new physical block in accordance with an embodiment of the present invention. A physical block 'B1' 1236 is typically obtained once it is determined that updates that are to be made to logical block 'A' 1200 have been completed. Once physical block 'B1' 1236 is obtained, contents of groups 1232 of RAM cache 1228 may be merged with contents of groups 1220 of physical block 'B' 1212, as for example as discussed above with respect to FIG. 10, and stored into physical block 'B1' 1236.

Since data associated with logical group 1204*b* have been updated in RAM cache 1228, updated data 1224' is merged with data 1220*b* which represents original data that was associated with logical group 1204*b*. It should be appreciated that data 1220*b* may include some current contents associated with logical group 1204, or data 1220*b* may effectively all be outdated in view of updated data 1224'. In order to substantially ensure that the most recent or current data associated with logical group 1204b is represented in physical block 'B1' 1236, a merge process is used to create merged data 1244 from updated data 1224' and data 1220b. Data contained in a RAM group 1232 of RAM cache 1228 is typically included in merged data when the same page offset associated with the same logical group 1204 also contains data within a corresponding physical group 1216. That is, when data corresponding to a page offset within a logical group 1204 is present in both a physical group 1216 and a RAM group 1232, the data in RAM group 1232 is included in merged data since the data in RAM group 1232 is more current.

Merged data 1244 may be stored into second physical group 1240b after data 1220a, which in the described embodiment is original data associated with logical group 1204a, is stored into physical group 1240a. As data 1220c associated with logical group 1204c was not updated, data 1220c may be stored into physical group 1240c. Logical group 1204d has associated original data 1220d that is stored in physical group 1216d of physical block 'B' 1212, as well as new or updated data 1240 that is stored in RAM group 1232b of RAM cache 1228. As such, a merge process is performed using data 1220d and new or updated data 1240 to create merged data 1248 which represents the most recent or current contents associated with logical group 1204d. Merged data 1248, as shown, is stored in physical group 1240d. Hence, physical block 'B' 1212 is outdated and may be erased, as well as disassociated from, logical block 'A' 1200, since physical block 'B1' 1236 now contains the current contents associated with logical block 'A' 1200.

FIG. 12d is a diagrammatic representation of logical block 1200, physical block 1212, and RAM cache 1228 in which the contents of the RAM cache exist because there is insufficient space in the physical block to accommodate new data in accordance with an embodiment of the present invention. Groups 1216 of physical block 1212 are such that group 1216a contains original data 1220a associated with logical group 1204b, group 1216b contains updated data 1220a' associated with logical group 1204b, group 1216c contains data 1220c associated with logical group 1204c, and group 1216d contains updated data 1220a" associated with logical group 1204d. As such, physical block 1212 is full in that there are no available groups 1216 into which additional data may be written.

If new data 1240 which corresponds to logical group 1204d is provided, new data 1240 is stored into an appropriate RAM group 1232 in RAM cache 1228. In one embodiment, the appropriate RAM group 1232 may be the first available RAM group 1232a within RAM cache 1228. When it is determined that there are no further updates to be made to logical block 'A' 1200, a new physical block 'B1' 1252 may be obtained to be associated with logical block 'A' 1200.

Within physical block 'B1' 1252, a first physical group 1260 includes merged data 1260 that is associated with logical group 1204b. Merged data 1260 is created by merging data 1220a, data 1220a', and data 1220a" such that the most recent data associated with logical group 1204b is included in merged data 1260. In order to substantially ensure that the most recent data associated with logical group 1204b is included in merged data 1260, groups 1216 are processed starting with group 1216d and ending with group 1216a such that the most recent data contained in particular page offsets associated with a given logical group may readily be identified.

Once merged data 1260 is created and stored into group 1256a, then data 1220c which is associated with logical group 1204c is stored into group 1256b, and data 1240, which is present in RAM cache 1228, is stored into group 1256. As a result, physical block 'B1' 1252 contains the most recent data associated with logical block 'A' 1200.

With reference to FIG. 13, the steps associated with one method of using a RAM cache to store updates associated with logical groups of a logical block will be described in accordance with an embodiment of the present invention. A process 1300 begins at step 1304 in which a host begins to process logical block 'A' which is associated with physical block 'B'. Processing logical block 'A' generally includes processing updates to logical groups within logical block 'A'.

In step 1308, a RAM cache is cleared. Once the RAM cache is cleared, updated contents associated with logical block 'A' are stored into the RAM cache in step 1312. Specifically, updated contents may be stored into appropriate RAM groups based on the logical group with which the updated contents are associated. Then, in step 1316, it is determined whether there are more updated contents associated with logical block 'A' that are to be stored. If it is determined that there are more updated contents to store, then process flow returns to step 1312 in which updated contents are stored.

Alternatively, if it is determined in step 1312 that there are no more updated contents to store for logical block 'A', then a new physical block 'B1' is allocated in step 1320 to be associated with logical block 'A'. In other words, a physical block 'B1' into which the most recent data associated with logical block 'A' is to be written is obtained. Once new physical block 'B1' is allocated, the contents of the RAM cache and the contents of physical block 'B' are merged into physical block 'B1' as appropriate in step 1324. Merging the contents may generally include merging contents associated with each logical group such that the merged contents are the most recent or current contents associated with each logical group.

Once the contents of the RAM cache and the contents of physical block 'B' are merged, then physical block 'B1' effectively contains the most recent contents associated with logical block 'A'. As such, in step 1328, physical block 'B' may be erased. After physical block 'B' is erased, physical block 'B' is disassociated from logical block 'A', and the process of using a RAM cache to store updates is completed.

In some cases, the use of a RAM cache may not be possible, as for example when there is not enough RAM available within a system. When a RAM cache is not used, a cache block or a block cache may instead be used to store updates to groups associated with a logical block. FIG. 14a is a diagrammatic representation of a RAM cache which is effectively divided into groups and is suitable for use in storing updates associated with a logical block which is divided into groups in accordance with an embodiment of the present invention. A logical block 'A' 1400 is divided into logical groups 1404 which, in turn, each include a number of logical pages 1408. A physical block 'B' 1412 is associated with logical block 'A' 4200 such that physical block 'B' 1412 contains data associated with logical block 'A' 1400. A first physical group 1416a, which includes physical pages (not shown), of physical block 'B' 1412 contains data 1420a associated with logical group 1404a. Similarly, a fourth physical group 1416d contains updated data 1420d associated with logical group 1404b. A second physical group 1416b contains data 1420b associated with logical group 1404a, and a third physical group 1416c contains data 1420c associated with logical group 1204c. Physical block 'B' 1412 does not contain any data associated with logical group 1404d.

When an update 1424 is received that includes data associated with logical group 1404d, update 1424 is stored into a first available group 1432a within a physical block cache 1428. If an additional update is received that indicates that data associated with logical group 1404d is once again to be updated, then such an update may be stored into the next available group 1432b within block cache 1428. As shown in FIG. 14b, when a new update 1426 which corresponds to logical group 1404d is received, the data in new update 1426 is stored into group 1432b. It should be appreciated that, in one embodiment, there may be some current data associated with logical group 1404d that is included in both data 1424 and data 1426. However, when a page of information exists in data 1426, if the corresponding page in data 1424 also contains information, the information in data 1426 will typically be used when the most current data associated with logical group 1404d is needed.

FIG. 14c is a diagrammatic representation of a logical block, i.e., logical block 'A' 1400 of FIG. 14b, and a new physical block after contents of the block cache and an original physical block associated with the logical block, i.e., block cache 1428 and physical block 'B' 1412 of FIG. 14b, have been merged into the new physical block in accordance with an embodiment of the present invention. A new physical block 'B1' 1440 may be obtained to be associated with logical block 'A' 1400 when there are essentially no more updates to be made to logical block 'A' 1400. It should be appreciated that when updates associated with logical block 'A' 1400 are completed, available groups 1432c, 1432d within block cache 1428 are effectively empty and available to store data associated with logical groups of a new or different logical block, or even logical block 'A' 1400 at a later time.

Once new physical block 'B1' 1440 is obtained, data 1420a and data 1420d, which are associated with logical group 1404b, are merged, as for example as shown in FIG. 10, to form merged data 1446 which may be stored into group 1444a of new physical block 'B1' 1440. Data 1420b may then be copied from group 1416b into group 1444b, and data 1420c may be copied from group 1416c into group 1444c.

Since block cache 1428 contains data 1424 and data 1426 that are associated with logical group 1404d, data 1424 and data 1426 are merged to form merged data 1448 that is stored into physical group 1444d of new physical block 'B1' 1440. Merged data 1448 generally includes the most recent or current contents associated with logical group 1404d. Once new physical block 'B1' 1440 is populated, new physical block 'B1' 1440 effectively includes the most recent or current contents associated with logical block 'A' 1400. As such, physical block 'B' 1412 is substantially outdated, and may be erased and disassociated from logical block 'A' 1400.

As previously mentioned, block cache 1428 includes available groups 1432 which may be used to store updates or new data associated with a different logical block or with logical block 'A' 1400 during the course of a subsequent updating process. With reference to FIG. 14d, the use of available groups 1432c, 1432d within block cache 1428 to store new updates associated with logical block 'A' 1400 will be described in accordance with an embodiment of the present invention. It should be appreciated that the contents of groups 1432a, 1432b within block cache 1428 may be old contents associated with substantially any logical block, and is not limited to being old contents associated with logical block 'A' 1400. Typically, old contents of groups 1432a, 1432b are associated with a different logical block.

When an update associated with logical group 1404d is received, contents of the update may be merged with previous data 1422a that corresponds to logical group 1404d and is stored in physical group 1416a' of physical block 1412'. Merged data 1450 that is associated with logical group 1404d may then be stored into first available group 1432c within block cache 1428. Similarly, when an update associated with logical group 1404b is received, contents of the update may be merged with previous data 1422c stored in physical group 1416c' that corresponds to logical group 1404b.

When additional information associated with logical block 'A' 1400 needs to be cached, since block cache 1428 is full, a new block cache may be obtained. Referring next to FIG. 14e, the use of two block caches that store updates associated with logical block 'A' 1400 will be described in accordance with an embodiment of the present invention. A new or current block cache 1464 may be obtained when block cache 1428 is full and an update to logical block 'A' 1400 is received. For instance, when an update associated with logical group 1404c is received, the data associated with the update may be merged with data 1422b contained in group 1416b', since data 1422b is also associated with logical group 1404c. Once merged data 1460 is created, merged data 1460 may be stored into a first available group 1468 in current block cache 1464.

In general, current cache block 1464 may be used to store updates, or merged updates as appropriate, until current cache block 1464 has no more available groups. When current cache block 1464 is full, and more updates associated with logical block 'A' 1400 are needed, then a new current cache block may be obtained.

If there are no more updates associated with logical block 'A' 1400 after merged data 1460 is stored into first available group 1468, then it may be determined if it is possible to merge contents of physical block 'B' 1412' and block cache 1428 into current block cache 1464, or if the contents of physical block 'B' 1412', block cache 1428, and current block cache 1464 are to be merged into a new physical block. In the embodiment as shown, it is possible to merge contents of physical block 'B' 1412' and block cache 1428 into current block cache 1464. FIG. 14f is a diagrammatic representation of current block cache 1464 after contents of block cache 1428 and contents of physical block 'B' 1412' are merged into current block cache 1464 in accordance with an embodiment of the present invention. Current block cache already includes data 1460 associated with logical group 1404c. Since block cache 1428 already includes merged data 1450 associated with logical group 1404d and merged data 1452 associated with logical group 1404b, i.e., since block cache 1428 already includes the most recent data associated with logical groups 1404b and 1404c, merged data 1450 may be copied into group 1468b, while merged data 1452 may be copied into group 1468c. Finally, original data 1422d which is associated with logical group 1404a and is contained in group 1416d' of physical block 'B' 1412' may be copied into group 1468d, thereby effectively consolidating the most recent contents associated with logical block 'A' 1400 into current block cache 1464. It should be appreciated that current block cache 1464 may then be associated with logical block 'A' 1400 as the new physical block that is associated with logical block 'A' 1400.

Referring next to FIGS. 15a and 15b, the steps associated with one method of storing updated contents in a block cache which uses groups will be described in accordance with an embodiment of the present invention. A process 1500 begins at step 1504 in which a host begins to process a logical block 'A', e.g., process updates of logical block 'A', which is associated with a physical block 'B'. In step 1508, it is determined whether there is a current cache block associated with logical block 'A', and if there is space available in the current cache block.

If it is determined in step 1508 that there is either no current cache block or that the current cache block has no available space, then a new current cache block is obtained in step 1512. Once the new current cache block is obtained, process flow moves to step 1516 in which contents created by merging data associated with a given logical group that is stored in a physical group within physical block 'B' and new data associated with the given logical group is stored into the current cache block. If it is determined in step 1508 that the current cache block has available space, process flow proceeds directly from step 1508 to step 1516.

Once merged contents are stored into the current cache block, it is determined in step 1520 whether there are more updated contents to store for logical block 'A'. If it is determined that there are more updated contents to be stored, then process flow returns to step 1508 in which it is determined whether there is space available in the current cache block. Alternatively, if it is determined that there are no more updated contents to be stored for logical block 'A', a determination is made in step 1524 as to whether there is adequate space in the current cache block to perform a merge of information contained in physical block 'B' and substantially any older, or outdated, cache blocks into the current cache block.

If it is determined that there is adequate space to perform a merge into the current cache block, the indication is that the current cache block is suitable for becoming the new physical block that is associated with logical block 'A' and, hence, suitable for containing substantially all current data associated with logical block 'A'. Accordingly, in step 1536, the contents of groups within physical block 'B', and the contents of groups in any older cache blocks are merged as appropriate into the current cache block such that the current cache block contains the most recent data associated with groups within logical block 'A'.

After the merge process into the current cache block is completed, physical block 'B' and any older or outdated cache blocks are erased in step 1540. Once physical block 'B' is erased, physical block 'B' is disassociated from logical block 'A' in step 1544, and the merged current cache block is associated with logical block 'A' in step 1548, thereby effectively becoming the physical block that is associated with logical block 'A' and contains the most recent contents associated with logical block 'A'. Once the merged cache block is associated with logical block 'A', the process of storing updated contents in a block cache is completed.

Returning to step 1524, if it is determined that a merge may not be performed into the current cache block, then the indication is that there is an insufficient number of physical groups within the current cache block to accommodate data associated with logical groups which are not currently represented in the current cache block. As such, in step 1528, a new physical block 'B1' is allocated for logical block 'A'. Then, in step 1532, the contents of groups within physical block 'B' are merged with the contents of groups in all cache blocks into physical block 'B1' as appropriate. From step 1532, process flow proceeds to step 1540 in which physical block 'B' and the cache blocks are erased. It should be appreciated that step 1548, in which a merged cache block is associated with logical block 'A', is not performed when physical block 'B1' is associated with logical block 'A'.

Although only a few embodiments of the present invention have been described, it should be understood that the present invention may be embodied in many other specific forms without departing from the spirit or the scope of the present invention. By way of example, while the use of a RAM cache and a physical block cache to at least temporarily store or cache updated data has been described, substantially any suitable memory may be used to cache updated data. In other words, a cache to store updates associated with a logical block before the updates are written into a physical block that is mapped to the logical block is not limited to being a RAM cache or a physical block cache.

The size of a flash memory and the size of blocks within the flash memory may be widely varied. While the size of blocks has generally been described as including approximately thirty-two pages, blocks may include any number of pages or, more generally, any number of elements which make up a block. For instance, a block may include approximately sixty-four elements or pages. As a result, the number of blocks within a system may vary. Within a 512 Mb NAND flash memory, if a block includes approximately thirty-two pages which each contain approximately 512 bytes, a total of 4096 physical blocks are present in the flash memory. Alternatively, within the same 512 Mb NAND flash memory, if each physical block includes approximately sixty-four pages which each contain approximately 512 bytes, a total of 2048 physical blocks may be present in the flash memory. In general, the size of pages may also vary.

The steps associated with the various methods of the present invention may be widely varied. In general, steps may be added, removed, reordered, and altered. By way of example, the method of using a physical block cache may include determining when the physical block cache is full, and combining the contents of the physical block cache and physical block 'A' as appropriate into physical block 'B' before continuing to cache updates into the physical block cache without departing from the spirit or the scope of the present invention. Further, a new physical block may not necessarily be obtained before updates are cached, e.g., a new physical block may be obtained as needed when it is time to copy contents of a RAM cache into a physical block or when it is time to move contents of an old physical block and a physical block cache. Therefore, the present examples are to be considered as illustrative and not restrictive, and the invention is not to be limited to the details given herein, but may be modified within the scope of the appended claims.

What is claimed is:

1. A method for processing contents associated with blocks of a non-volatile memory, the non-volatile memory being associated with a memory system, the method comprising:

mapping a first logical block to a first physical block, the first logical block including a plurality of logical groups, each logical group including a plurality of logical pages, and the first physical group including a plurality of physical groups, each physical group including a plurality of physical pages;

writing a first set of contents associated with a first logical group of the first logical block to a first physical group of the first physical block;

writing a second set of contents, associated with logical pages of the first logical group, into a memory area;

writing the first set of contents from the first physical group of the first physical block and the second set of contents from the memory area into a first physical group of a second physical block, the second physical block including a plurality of physical groups, each physical group including a plurality of physical pages; and mapping the second physical block to the first logical block.

2. The method of claim 1 further including:
erasing the first physical block; and
unmapping the first physical block from the first logical block.

3. The method of claim 2 further including:
erasing the second set of contents from the memory area.

4. The method of claim 1 wherein writing the first set of contents into the memory area includes overwriting contents previously stored in the memory area.

5. The method of claim 4 wherein the memory area is a RAM cache.

6. The method of claim 1 wherein the second set of contents includes an update associated with the first logical block.

7. The method of claim 1 further including:
obtaining a third set of contents, the third set of contents being associated with a second logical group of the first logical block, the second logical group including a second plurality of logical pages associated with the first logical block;
writing the third set of contents into the memory area; and
writing the third set of contents into a second physical group of the second physical block.

8. The method of claim 7
wherein the steps of writing the first set of contents, and of writing the third set of contents to the second physical group of the second physical block, are performed responsive to determining that additional contents for the first logical block do not currently remain to be written.

9. The method of claim 8 wherein the determining contents associated with the first logical block do not currently remain to be written includes determining that a second logical block is to be updated.

10. The method of claim 9 further including:
erasing first physical block; and
unmapping the first physical block from the first logical block.

11. The method of claim 1 wherein the memory area is one of a third physical block or a RAM cache.

12. The method of claim 1 wherein the non-volatile memory is a NAND flash memory.

13. A method for processing updated contents associated with a first logical block within a non-volatile memory system, the first logical block being mapped to a first physical block, the first logical block including a plurality of logical groups, each logical group including a plurality of logical pages, and the first physical block including a plurality of physical groups, each physical group including a plurality of physical pages, the method comprising:

receiving a first update associated with the first logical block, wherein the first update is an update to contents of a first logical group of the first logical block, the contents of the first logical group having been written to a first physical group of the first physical block;

storing the first update into a cache;

determining whether to store contents of the cache, including the first update, into a second physical block;

storing the contents of the cache into the second physical block responsive to determining that the contents of the cache are to be stored into the second physical block, wherein storing the contents of the cache includes storing the first update into a first physical group in the second physical block, the second physical block including a plurality of physical groups, each physical group including a plurality of physical pages included in the first physical group;

then mapping the second physical block to the first logical block after the contents of the cache are stored into the second physical block; and unmapping the first physical block from the first logical block.

14. The method of claim 13 wherein determining whether to store the contents of the cache into the second physical block includes determining that a second logical block is to be processed.

15. The method of claim 13 wherein the step of storing the first update overwrites at least a portion of previously stored contents associated with the first physical block.

16. The method of claim 13 wherein the cache is a RAM cache.

17. The method of claim 13 further including:
erasing the first physical block after at least some of the contents of the cache are stored into the second physical block.

18. The method of claim 13 wherein the cache is a physical block cache.

* * * * *